US012792861B2

(12) United States Patent
Yamada et al.

(10) Patent No.: US 12,792,861 B2
(45) Date of Patent: Nov. 10, 2026

(54) INFORMATION PROCESSING APPARATUS, METHOD, AND NON-TRANSITORY COMPUTER-READABLE STORAGE MEDIUM

(71) Applicant: CANON KABUSHIKI KAISHA, Tokyo (JP)

(72) Inventors: Takayuki Yamada, Kanagawa (JP); Shinjiro Hori, Kanagawa (JP); Kouta Murasawa, Kanagawa (JP); Kazuya Ogasawara, Kanagawa (JP); Kazufumi Kondo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 18/895,489

(22) Filed: Sep. 25, 2024

(65) Prior Publication Data

US 2025/0103842 A1 Mar. 27, 2025

(30) Foreign Application Priority Data

Sep. 26, 2023 (JP) ................................ 2023-163583

(51) Int. Cl.
*G06K 15/02* (2006.01)

(52) U.S. Cl.
CPC ..... *G06K 15/1878* (2013.01); *G06K 15/1859* (2013.01); *G06K 2215/101* (2013.01)

(58) Field of Classification Search
CPC ........... G06K 15/1878; G06K 15/1859; G06K 2215/101
USPC ........................................................ 358/1.9
See application file for complete search history.

(56) References Cited

U.S. PATENT DOCUMENTS

| | | | | |
|---|---|---|---|---|
| 5,424,945 A * | 6/1995 | Bell | G06F 40/30 715/209 |
| 2005/0094871 A1* | 5/2005 | Berns | H04N 1/6033 358/1.9 |
| 2020/0374419 A1* | 11/2020 | Liefferink | H04N 1/6005 |

FOREIGN PATENT DOCUMENTS

JP 2017059123 A 3/2017

OTHER PUBLICATIONS

Co-pending U.S. Appl. No. 18/895,493 of Yamada filed on Sep. 25, 2024.
Co-pending U.S. Appl. No. 18/814,699 to Ogasawara et al., filed on Aug. 26, 2024.

* cited by examiner

*Primary Examiner* — Charlotte M Baker
(74) *Attorney, Agent, or Firm* — Venable LLP

(57) ABSTRACT

An information processing apparatus includes: an acquisition unit that acquires information of a color gamut reproducible by a printing unit that prints the commercial material; a generation unit that generates a plurality of commercial material data based on the accepted contents, the accepted designation of the impression, and the accepted condition of the commercial material; and a display unit that displays a commercial material image based on the generated plurality of commercial material data. The commercial material image is an image represented by data specified based on the accepted designation of the impression from a plurality of data generated from the plurality of commercial material data based on the acquired information of the color gamut.

20 Claims, 23 Drawing Sheets

FIG. 3A

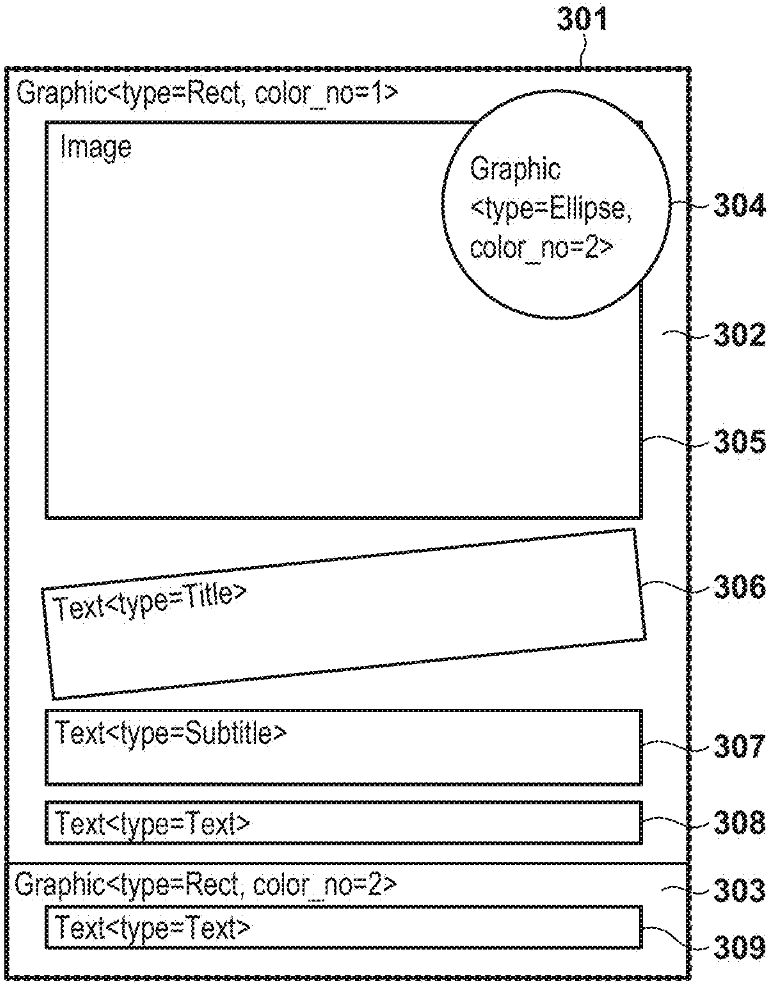

FIG. 3B

| OBJECT | METADATA | VALUE (or ATTRIBUTE) |
|---|---|---|
| GRAPHICS (Graphics) | type (SHAPE) | Rect (RECTANGLE)<br>Ellipse (ELLIPSE)<br>... |
| | color_no (COLORING NUMBER) | INTEGRAL |
| IMAGE (Image) | Type | Rect (RECTANGLE)<br>Ellipse (ELLIPSE)<br>... |
| CHARACTER STRING (Text) | type (TYPE) | Title (TITLE)<br>SubTitle (SUBTITLE)<br>Text (TEXT) |
| | TEXT POSITION | RIGHT ALIGNMENT<br>CENTER<br>LEFT ALIGNMENT |
| | DIRECTION | HORIZONTAL WRITING<br>VERTICAL WRITING |
| SKELETON | USE CATEGORY | RESTAURANT<br>SPORT<br>SCHOOL<br>... |

FIG. 4

| COLORING ID | COLOR 1 | COLOR 2 | COLOR 3 | COLOR 4 |
|---|---|---|---|---|
| 1 | (0, 0, 0) | (12, 66, 113) | (10, 129, 171) | (249, 223, 220) |
| 2 | (0, 48, 63) | (205, 172, 129) | (202, 228, 219) | (245, 244, 244) |
| 3 | (0, 168, 204) | (12, 123, 147) | (39, 73, 109) | (20, 40, 80) |
| 4 | (2, 2, 5) | (228, 58, 25) | (242, 244, 247) | (17, 31, 77) |

⋮

| SKELETON NAME | PREMIUM NATURE | FAMILIARITY | DYNAMISM | PROFOUNDNESS |
|---|---|---|---|---|
| SKELETON 1 | -1 | -1 | -2 | 0 |
| SKELETON 2 | -1 | +2 | +1 | -2 |
| SKELETON 3 | 0 | -1 | +2 | +1 |
| SKELETON 4 | +1 | -2 | -2 | +2 |

| SKELETON NAME | DISTANCE |
|---|---|
| SKELETON 1 | 2.8 |
| SKELETON 2 | 4.7 |
| SKELETON 3 | 4.2 |
| SKELETON 4 | 1 |

FIG. 11A

| COLORING ID | COLOR 1 | COLOR 2 | COLOR 3 | COLOR 4 | PREMIUM NATURE | FAMILIARITY | DYNAMISM | PRO-FOUNDNESS |
|---|---|---|---|---|---|---|---|---|
| 1 | (0, 68, 69) | (44, 120, 108) | (250, 245, 228) | (248, 180, 0) | -1 | +1 | -2 | +2 |
| 2 | (157, 37, 3) | (223, 133, 67) | (241, 241, 176) | (127, 169, 151) | -2 | 0 | +2 | +1 |
| 3 | (245, 176, 203) | (213, 151, 206) | (116, 92, 151) | (57, 55, 91) | +2 | 0 | -1 | -1 |
| 4 | (255, 255, 199) | (169, 241, 223) | (30, 174, 152) | (35, 62, 139) | +1 | +2 | -1 | -2 |

⋮

FIG. 11B

| FONT ID | TITLE FONT | TEXT FONT | PREMIUM NATURE | FAMILIARITY | DYNAMISM | PROFOUNDNESS |
|---|---|---|---|---|---|---|
| 1 | FONT 5 | FONT 2 | -1 | +2 | +2 | -1 |
| 2 | FONT 8 | FONT 1 | +2 | +2 | +1 | -2 |
| 3 | FONT 12 | FONT 1 | +1 | +1 | -1 | +1 |
| 4 | FONT 6 | FONT 1 | +1 | -1 | 0 | 0 |

⋮

| SETTING ITEM | SET CONTENT |
|---|---|
| TITLE | BIG SUMMER THANK-YOU SALE |
| SUBTITLE | BLOW AWAY THE MIDSUMMER HEAT |
| TEXT | (NOT SET) |
| IMAGE |  1401 |
| PICTURE | |
| LOGO | |

| FONT ID | TITLE FONT | TEXT FONT |
|---|---|---|
| 2 | FONT 8 | FONT 1 |
| 3 | FONT 12 | FONT 1 |

| COLORING ID | COLOR 1 | COLOR 2 | COLOR 3 | COLOR 4 |
|---|---|---|---|---|
| 1 | (0, 68, 69) | (44, 120, 108) | (250, 245, 228) | (248, 180, 0) |
| 4 | (255, 255, 199) | (169, 241, 223) | (30, 174, 152) | (35, 62, 139) |

F I G. 16A
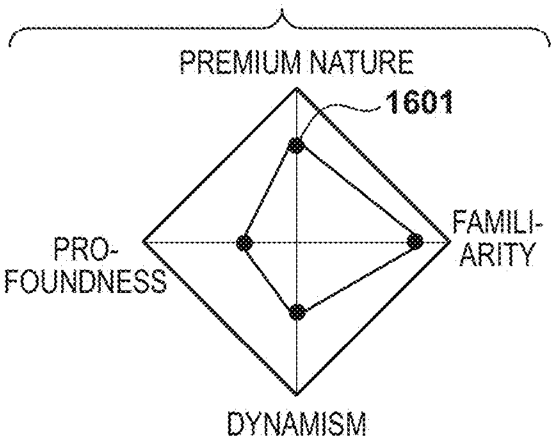
F I G. 16B
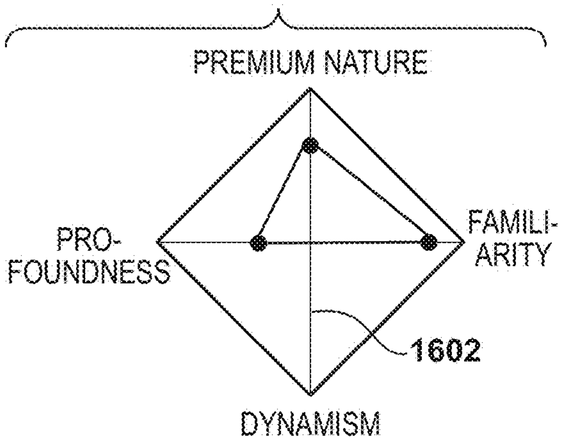
F I G. 16C
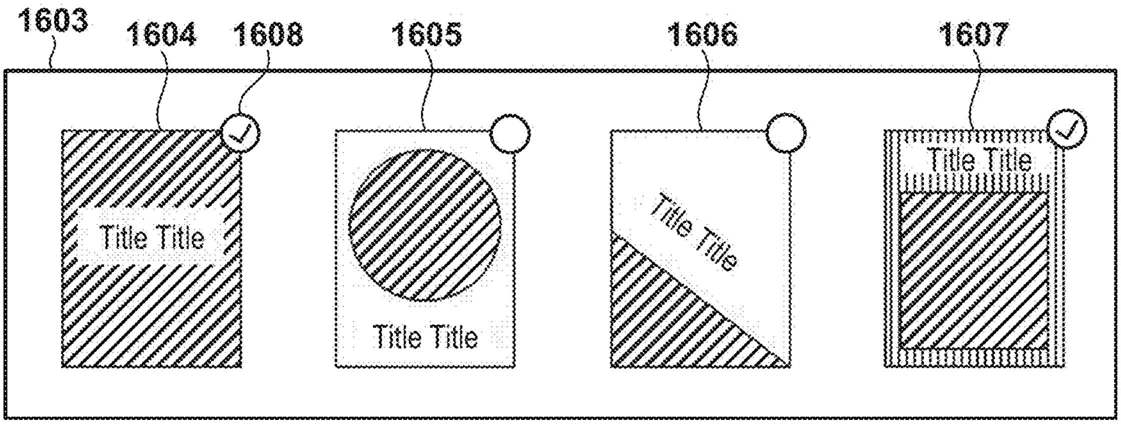
F I G. 16D
| POSTER | SELECTED STATE | PREMIUM NATURE | FAMILIARITY | DYNAMISM | PRO-FOUNDNESS |
|---|---|---|---|---|---|
| 1604 | ✓ | +2 | -0.5 | -0.1 | +0.1 |
| 1605 | | 0 | +2 | +0.1 | -0.2 |
| 1606 | | +0.4 | -0.1 | +2 | +0.2 |
| 1607 | ✓ | -0.1 | 0 | +0.3 | +2 |
| TARGET IMPRESSION | | +2 | -0.5 | +0.3 | +2 |

FIG. 19A

| SKELETON ID | FILE NAME |
|---|---|
| 1 | SKELETON 1 |
| 2 | SKELETON 2 |
| 3 | SKELETON 3 |
| 4 | SKELETON 4 |
| ... | |

FIG. 19B

| FONT ID | TITLE FONT | TEXT FONT |
|---|---|---|
| 1 | FONT 5 | FONT 2 |
| 2 | FONT 8 | FONT 1 |
| 3 | FONT 12 | FONT 1 |
| 4 | FONT 6 | FONT 1 |
| ... | | |

FIG. 19C

| COLORING ID | COLOR 1 | COLOR 2 | COLOR 3 | COLOR 4 |
|---|---|---|---|---|
| 1 | (0, 68, 69) | (44, 120, 108) | (250, 245, 228) | (248, 180, 0) |
| 2 | (157, 37, 3) | (223, 133, 67) | (241, 241, 176) | (127, 169, 151) |
| 3 | (245, 176, 203) | (213, 151, 206) | (116, 92, 151) | (57, 55, 91) |
| 4 | (255, 255, 199) | (169, 241, 223) | (30, 174, 152) | (35, 62, 139) |
| ... | | | | |

FIG. 19D

| GAMUT MAPPING ID | METHOD NAME |
|---|---|
| 1 | Perceptual |
| 2 | Saturation |
| 3 | Colorimetric |
| ... | |

FIG. 19E

| COMBINATION ID | SKELETON ID | COLORING ID | FONT ID | GAMUT MAPPING ID |
|---|---|---|---|---|
| 1 | 1 | 9 | 2 | 3 |
| 2 | 5 | 4 | 6 | 1 |
| 3 | 3 | 10 | 4 | 2 |
| 4 | 8 | 4 | 9 | 2 |
| ... | | | | |
| 100 | 10 | 3 | 21 | 1 |

FIG. 20A

| COMBINATION ID | SKELETON ID | COLORING ID | FONT ID | GAMUT MAPPING ID | DISTANCE |
|---|---|---|---|---|---|
| 1 | 1 | 9 | 2 | 3 | 1.2 |
| 2 | 5 | 4 | 6 | 1 | 0.7 |
| 3 | 3 | 10 | 4 | 2 | 1.1 |
| 4 | 8 | 4 | 9 | 2 | 2.3 |
| ... | | | | | |
| 100 | 10 | 3 | 21 | 1 | 1.5 |

FIG. 20B

| COMBINATION ID | SKELETON ID | COLORING ID | FONT ID | GAMUT MAPPING ID |
|---|---|---|---|---|
| 1 | 1 | 10 | 2 | 1 |
| 2 | 3 | 9 | 4 | 3 |
| 3 | 10 | 3 | 6 | 2 |
| 4 | 5 | 4 | 21 | 1 |
| ... | | | | |
| 100 | 3 | 5 | 13 | 3 |

INFORMATION PROCESSING APPARATUS, METHOD, AND NON-TRANSITORY COMPUTER-READABLE STORAGE MEDIUM

BACKGROUND OF THE INVENTION

Field of the Invention

The present invention relates to an information processing apparatus, a method, and a non-transitory computer-readable storage medium storing a program.

Description of the Related Art

There is conventionally known a technique for preparing a template that stores information such as the shape and arrangement of images, characters, and graphics constituting a poster and automatically arranging images, characters, and graphics in accordance with the template, thereby generating a poster. Japanese Patent Laid-Open No. 2017-59123 proposes generating a poster by selecting a template in ascending order of the difference between the impression evaluation value of a template and the impression evaluation value of an image.

SUMMARY OF THE INVENTION

In Japanese Patent Laid-Open No. 2017-59123, a template in which the difference between the impression evaluation value of the template and the impression evaluation value of an image is small is selected, but in that document generating a commercial material that gives an impression intended by a user, including a color change at the time of printing, is not taken into consideration at all.

The present invention provides an information processing apparatus capable of printing a commercial material that appropriately gives an impression intended by a user, a method, and a non-transitory computer-readable storage medium storing a program.

The present invention in one aspect provides an information processing apparatus comprising: at least one processor and at least a memory coupled to the at least one processor and having instructions stored thereon, and when executed by the at least one processor, acting as: a first acceptance unit configured to accept contents of a commercial material; a second acceptance unit configured to accept a designation of an impression the commercial material gives to a user; a third acceptance unit configured to accept a condition of the commercial material; an acquisition unit configured to acquire information of a color gamut reproducible by a printing unit that prints the commercial material; a generation unit configured to generate a plurality of commercial material data based on the contents accepted by the first acceptance unit, the designation of the impression accepted by the second acceptance unit, and the condition of the commercial material accepted by the third acceptance unit; and a display unit configured to display a commercial material image based on the plurality of commercial material data generated by the generation unit, wherein the commercial material image is an image represented by data specified based on the designation of the impression accepted by the second acceptance unit from a plurality of data generated from the plurality of commercial material data based on the information of the color gamut acquired by the acquisition unit.

According to the present invention, it is possible to print a commercial material that appropriately gives an impression intended by a user.

Further features of the present invention will become apparent from the following description of exemplary embodiments with reference to the attached drawings.

BRIEF DESCRIPTION OF THE DRAWINGS

FIGS. 3A and 3B are views showing a skeleton;

FIG. 4 is a view showing a table of coloring patterns;

FIGS. 11A and 11B are views showing a coloring pattern impression table;

FIGS. 16A to 16D are views showing a UI configured to set a target impression;

FIGS. 19A to 19E are views for explaining tables used by a combination generation unit;

FIGS. 20A and 20B are views for explaining the operation of S1801 from the second loop;

DESCRIPTION OF THE EMBODIMENTS

Figure 1:
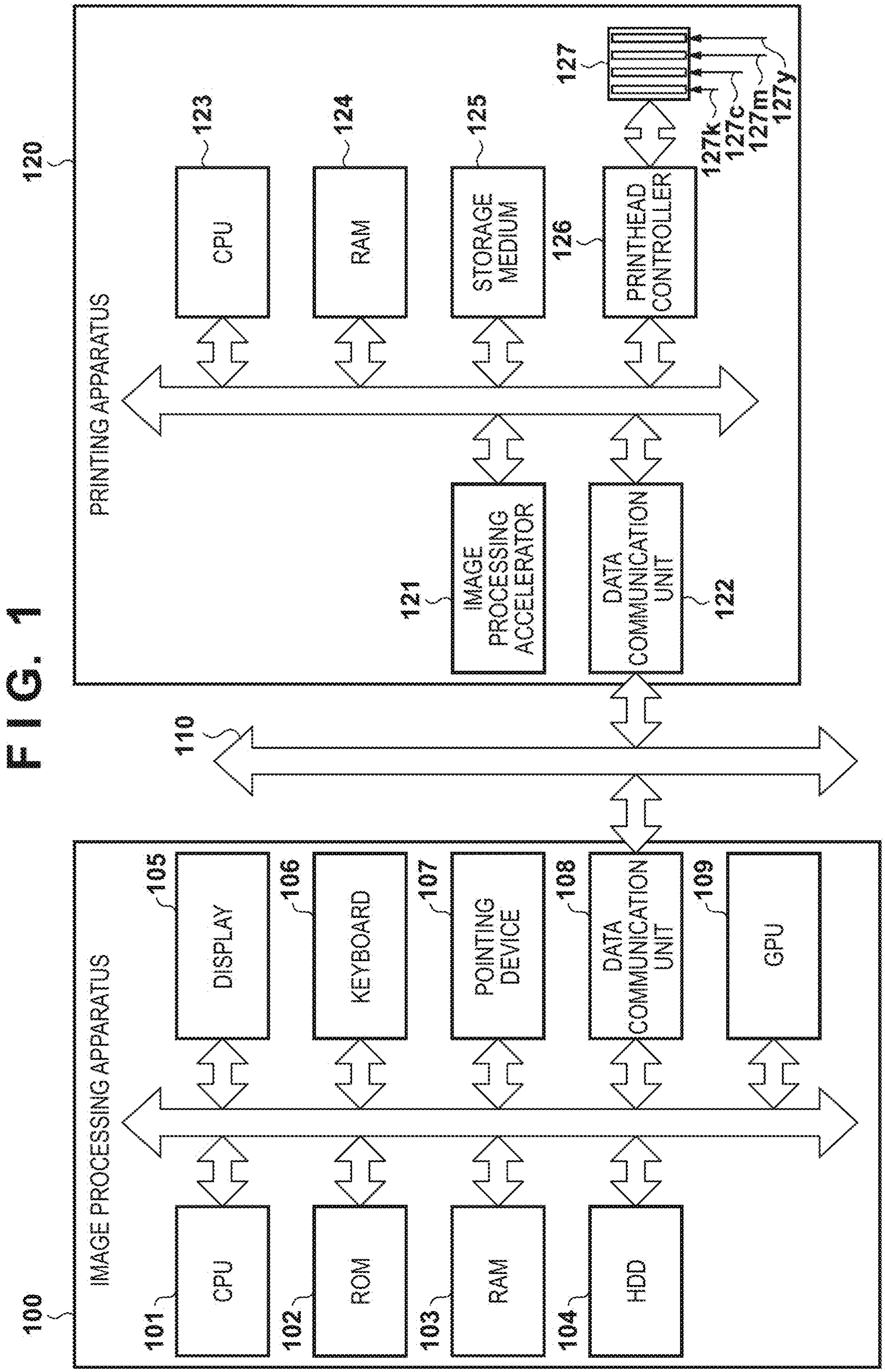
FIG. 1 is a block diagram showing the hardware configuration of a poster generation apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Terms used in this embodiment are defined in advance, as follows.

<Color Reproduction Region>

"Color reproduction region" is also called a color reproduction range, a color gamut, or a gamut. Generally, "color reproduction region" indicates the range of colors that can be reproduced in an arbitrary color space. In addition, a gamut volume is an index representing the extent of this color reproduction range. The gamut volume is a three-dimensional volume in an arbitrary color space. Chromaticity points forming the color reproduction range are sometimes discrete. For example, a specific color reproduction range is represented by 729 points on CIE-L*a*b*, and points between them are obtained by using a well-known interpolating operation such as tetrahedral interpolation or cubic interpolation. In this case, as the corresponding gamut volume, it is possible to use a volume obtained by calculating the volumes on CIE-L*a*b* of tetrahedrons or cubes forming the color reproduction range and accumulating the calculated volumes, in accordance with the interpolating operation method. The color reproduction region and the color gamut in this embodiment are not limited to a specific color space. In this embodiment, however, a color reproduction region in the CIE-L*a*b* space will be explained as an example. Furthermore, the numerical value of a color reproduction region in this embodiment indicates a volume obtained by accumulation in the CIE-L*a*b* space on the premise of tetrahedral interpolation.

<Gamut Mapping>

"Gamut mapping" is processing of performing conversion between different color gamuts, and is, for example, mapping of an input color gamut to an output color gamut of a device such as a printer. Perceptual, Saturation, Colorimetric, and the like of the ICC profile are general. The mapping processing may be implemented by, for example, conversion by a three-dimensional lookup table (3DLUT). Furthermore, the mapping processing may be performed after conversion of a color space into a standard color space. For example, if an input color space is sRGB, conversion into the CIE-L*a*b* color space is performed and then the mapping processing to an output color gamut is performed on the CIE-L*a*b* color space. The mapping processing may be conversion by a 3DLUT or may be performed using a conversion formula. Conversion between the input color space and the output color space may be performed simultaneously. For example, the input color space may be the sRGB color space, and conversion into RGB values or CMYK values unique to a printer may be performed at the time of output.

In this embodiment, a method of operating an application for poster generation in a poster generation apparatus and automatically generating a poster will be described as an example. Note that in the following explanation, "image" includes a still image and a frame image extracted from a moving image, unless it is specifically stated otherwise.

FIG. 1 is a block diagram showing the hardware configuration of a poster generation apparatus 100. Note that the poster generation apparatus 100 is an information processing apparatus, and examples are a personal computer (to be referred to as a PC hereinafter) and a smartphone. In this embodiment, a description will be made assuming that the poster generation apparatus is a PC. The poster generation apparatus 100 includes a CPU 101, a ROM 102, a RAM 103, an HDD 104, a display 105, a keyboard 106, a pointing device 107, a data communication unit 108, and a GPU 109.

The CPU (central processing unit/processor) 101 generally controls the poster generation apparatus 100 and, for example, reads out a program stored in the ROM 102 to the RAM 103 and executes it, thereby implementing an operation according to this embodiment. FIG. 1 shows one CPU, but a plurality of CPUs may be provided. The ROM 102 is a general-purpose ROM and stores, for example, programs to be executed by the CPU 101. The RAM 103 is a general-purpose RAM and is used as a working memory for temporarily storing various kinds of information, for example, at the time of execution of the programs by the CPU 101.

The HDD (hard disk) 104 is a storage medium (storage unit) configured to store databases that hold image files and processing results of image analysis and the like, and skeletons used by a poster creation application. The skeleton will be described later. The display 105 is a display unit that displays, to a user, a user interface (UI) according to this embodiment and an electronic poster as a layout result of image data (to be also referred to as "images" hereinafter). The keyboard 106 and the pointing device 107 accept instruction operations from the user. The display 105 may have a touch sensor function.

The keyboard 106 is used by the user to, for example, input the number of double-page spreads of a poster to be created on the user interface (UI) displayed on the display 105. The pointing device 107 is used by the user to, for example, click a button on the UI displayed on the display 105.

The data communication unit 108 performs communication with an external apparatus via a wired or wireless network. The data communication unit 108, for example, transmits data laid out by an automatic layout function to a printer or a server capable of communicating with the poster generation apparatus 100. The GPU 109 is a Graphics Processing Unit and can perform an efficient operation by parallelly processing more data. The GPU 109 is used when, for example, performing learning a plurality of times using a learning model such as deep learning. A data bus 110 connects the blocks shown in FIG. 1 communicably to each other. Note that the configuration shown in FIG. 1 is merely an example, and the configuration is not limited to this. For example, the poster generation apparatus 100 may display a UI on an external display.

The poster creation application according to this embodiment is stored in the HDD 104. The poster creation application is activated by the user executing an operation of clicking or double-clicking, using the pointing device 107, the icon of the application displayed on the display 105.

Next, a printing apparatus 120 includes an image processing accelerator 121, a data communication unit 122, a CPU 123, a RAM 124, a storage medium 125, a printhead controller 126, and a printhead 127.

The CPU 123 generally controls the printing apparatus 120 by reading out a program stored in the storage medium 125 to the RAM 124 serving as a work area and executing it. The image processing accelerator 121 is hardware capable of executing image processing at a higher speed than the CPU 123. The image processing accelerator 121 is activated by the CPU 123 writing parameters and data necessary for image processing to a predetermined address of the RAM 124. After the parameters and data are loaded, the image processing accelerator 121 executes image processing for the data. Note that the image processing accelerator 121 need not be an essential element, and similar processing may be executed by the CPU 123. The parameters may be stored in the storage medium 125 or may be stored in a storage (not shown) such as a flash memory or an HDD.

Image processing performed by the CPU 123 or the image processing accelerator 121 will be described here. Image processing is, for example, processing of generating data indicating a dot formation position of ink in each scanning by the printhead 127 based on acquired print data. The CPU 123 or the image processing accelerator 121 performs color conversion processing and quantization processing of acquired print data.

The color conversion processing is processing of performing color separation to ink concentrations to be used in the printing apparatus 120. For example, the acquired print data contains image data indicating an image. In a case where the image data is data indicating an image in a color space coordinate system such as sRGB as the expression colors of a monitor, data indicating an image by color coordinates (R, G, B) of the sRGB is converted into ink data (CMYK) to be handled by the printing apparatus 120. The color conversion method is implemented by, for example, matrix operation processing or processing using a 3DLUT or 4DLUT.

In this embodiment, as an example, the printing apparatus 120 uses inks of black (K), cyan (C), magenta (M), and yellow (Y) for printing. Therefore, image data of RGB signals is converted into image data formed by 8-bit color signals of K, C, M, and Y. The color signal of each color corresponds to the application amount of each ink. Furthermore, the ink colors are four colors of K, C, M, and Y, as examples. However, to improve image quality, it is also possible to use other ink colors such as inks of fluorescent ink (F) and light cyan (Lc), light magenta (Lm), and gray (Gy) having low concentrations. In this case, color signals corresponding to the inks are generated.

After the color conversion processing, quantization processing is performed for the ink data. This quantization processing is processing of decreasing the number of tone levels of the ink data. In this embodiment, quantization is performed by using a dither matrix in which thresholds to be compared with the values of the ink data are arrayed in individual pixels. After the quantization processing, binary data indicating whether to form a dot in each dot formation position is finally generated.

After the image processing is performed, the printhead controller 126 transfers the binary data to the printhead 127. At the same time, the CPU 123 performs printing control via the printhead controller 126 so as to operate a carriage motor (not shown) for operating the printhead 127, and to operate a conveyance motor for conveying a print medium. The printhead 127 scans the print medium and also discharges ink droplets onto the print medium, thereby forming an image.

The image processing apparatus 100 and the printing apparatus 120 are connected to each other via the communication line 110. In this embodiment, a Local Area Network (LAN) will be explained as an example of the communication line 110. However, the connection may also be obtained by using, for example, a USB hub, a wireless communication network using a wireless access point, or a Wifi direct communication function.

A description will be provided below by assuming that the printhead 127 has nozzle arrays for four color inks of cyan (C), magenta (M), yellow (Y), and black (K).

Figure 23:
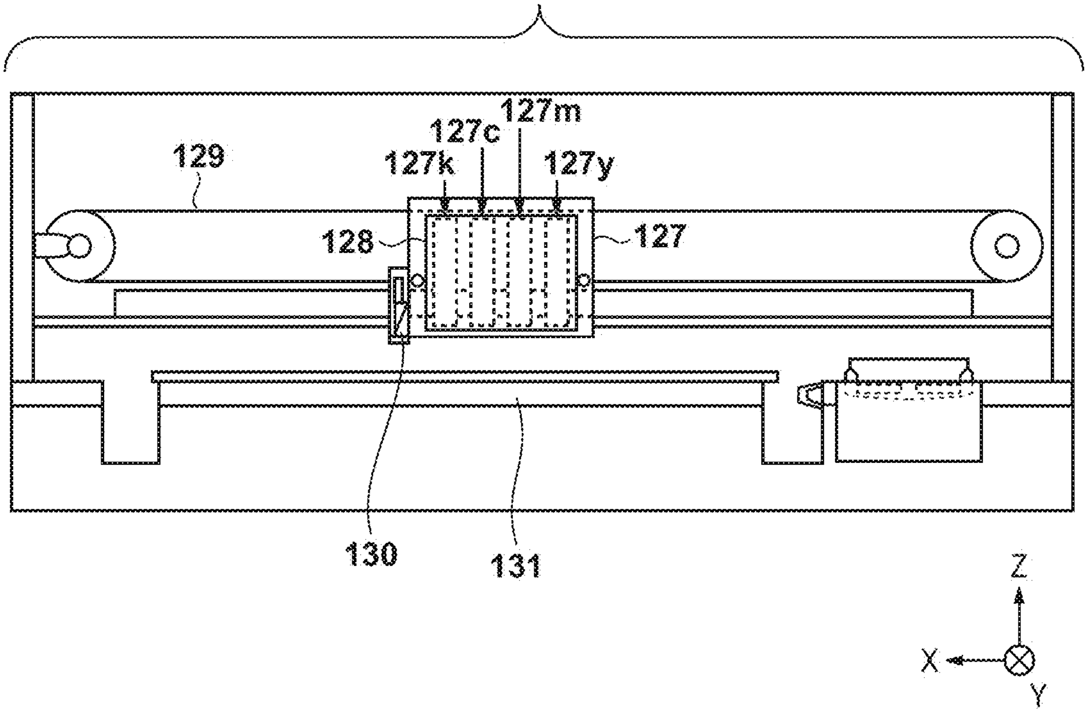
FIG. 23 is a view for explaining a printhead.

FIG. 23 is a view for explaining the printhead 127 according to this embodiment. In this embodiment, an image is printed on a unit area for one nozzle array by N scans. The printhead 127 includes a carriage 128, nozzle arrays 127*k*, 127*c*, 127*m*, and 127*y*, and an optical sensor 130. The carriage 128 on which the four nozzle arrays 127*k*, 127*c*, 127*m*, and 127*y* and the optical sensor 130 are mounted can reciprocally move along the X direction (a main scan direction) in FIG. 23 by the driving force of a carriage motor transmitted via a belt 129. While the carriage 128 moves in the X direction relative to a print medium, ink droplets are discharged from each nozzle of the nozzle arrays in the gravity direction (the −Z direction in FIG. 23) based on print data. Consequently, an image is printed by 1/N of a main scan on the print medium placed on a platen 131. Upon completion of one main scan, the print medium is conveyed along a conveyance direction (the −Y direction in FIG. 23) crossing the main scan direction by a distance corresponding to the width of 1/N of the main scan. These operations print an image having the width of one nozzle array by N scans. An image is gradually formed on the print medium by alternately repeating the main scan and the conveyance operation, as described above. In this way, control is executed to complete image printing in a predetermined area.

Figure 2:
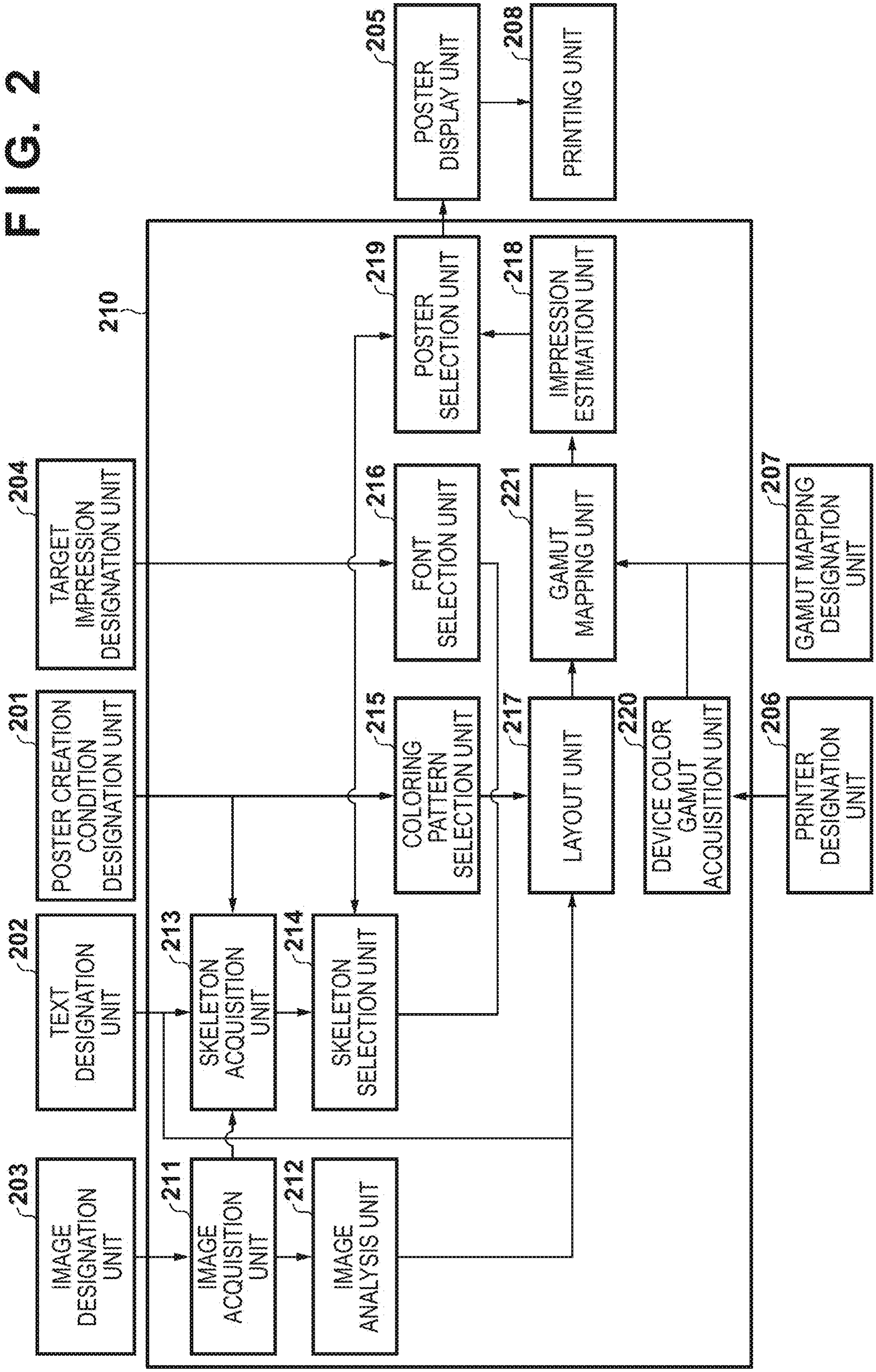
FIG. 2 is a software block diagram of a poster creation application.

FIG. 2 is a software block diagram of a poster creation application. The poster creation application includes a poster creation condition designation unit 201, a text designation unit 202, an image designation unit 203, a target impression designation unit 204, a poster display unit 205, a printer designation unit 206, a gamut mapping designation unit 207, a printing unit 208, and a poster generation unit 210. Furthermore, the poster generation unit 210 includes an image acquisition unit 211, an image analysis unit 212, a skeleton acquisition unit 213, a skeleton selection unit 214, a coloring pattern selection unit 215, a font selection unit 216, a layout unit 217, a device color gamut acquisition unit 220, a gamut mapping unit 221, an impression estimation unit 218, and a poster selection unit 219.

When the poster creation application is installed in the poster generation apparatus 100, an activation icon is displayed on the top screen (desktop) of an operating system (OS) operating on the poster generation apparatus 100. If the user operates (for example, double-clicks) the activation icon displayed on the display 105 using the pointing device 107, the program of the poster creation application stored in the HDD 104 is loaded into the RAM 103 and executed by the CPU 101. The poster creation application is thus activated.

Program modules corresponding to the constituent elements shown in FIG. 2 are included in the above-described poster creation application. When the CPU 101 executes the program modules, the CPU 101 functions as the constituent elements shown in FIG. 2. The constituent elements shown in FIG. 2 will be described below assuming that these execute various kinds of processing. Also, FIG. 2 shows a software block diagram particularly associated with the poster generation unit 210 that executes an automatic poster creation function.

In accordance with a UI operation using the pointing device 107, the poster creation condition designation unit 201 designates poster creation conditions in the poster generation unit 210. In this embodiment, as the poster creation conditions, the size, the creation count, and the application purpose category of a poster are designated. As the size of the poster, the actual values of a width and a height may be designated, or a paper size such as A1 or A2 may be designated. The application purpose category is a category indicating for what kind of application purpose the poster is to be used, and examples are restaurant, school event, and sale.

By a UI operation using the keyboard 106, the text designation unit 202 designates character information to be arranged on the poster. Character information to be arranged on the poster indicates a character string indicating, for example, a title, a date/time, a location, or the like. Also, the text designation unit 202 links each character information with the title, the date/time, or the location such that the type of information can be discriminated, and it then outputs the character information to the skeleton acquisition unit 213 and the layout unit 217.

The image designation unit 203 designates one or a plurality of image data that are stored in the HDD 104 and are to be arranged on the poster. The image data may be designated, for example, based on the structure of a file system including image data, such as a device and a directory, or may be designated based on additional information such as an image capturing date/time for identifying an image or attribute information. The image designation unit 203 outputs the file path of the designated image to the image acquisition unit 211.

The target impression designation unit 204 designates the target impression of the poster to be created. The target impression is an impression the poster to be created is requested to finally evoke. In this embodiment, an intensity representing the degree of an impression to be imparted to a word representing the impression is designated by a UI operation using the pointing device 107. Information indicating the target impression designated by the target impression designation unit 204 is shared by the skeleton selection unit 214, the coloring pattern selection unit 215, the font selection unit 216, and the poster selection unit 219. Details of the impression will be described later.

The gamut mapping designation unit 207 designates one or a plurality of gamut mapping methods to be used by the gamut mapping unit 221. In this embodiment, which one of gamut mapping methods such as Perceptual, Saturation, and Colorimetric is to be used is designated by a UI operation using the pointing device 107.

The configuration of the poster generation unit 210 will be described next in detail. The image acquisition unit 211 acquires one or a plurality of image data designated by the image designation unit 203 from the HDD 104. The image acquisition unit 211 outputs the acquired image data to the image analysis unit 212. In addition, the image acquisition unit 211 outputs the number of acquired images to the skeleton acquisition unit 213. Examples of an image stored in the HDD 104 are a still image and a frame image cut out from a moving image. The still image and the frame image are acquired from an image capturing device such as a digital camera or a smart device. The image capturing device may be provided in the poster generation apparatus 100 or may be provided in an external apparatus. Note that if the image capturing device is an external apparatus, the image is acquired via the data communication unit 108. Also, as another example, the still image may be an illustration image created by image editing software or a CG image created by Computer Graphics (CG) generation software. The still image and the cutout image may be images acquired from a network or a server via the data communication unit 108. An example of the image acquired from the network or the server is a social networking service image (to be referred to as an "SNS image" hereinafter). Also, the program executed by the CPU 101 analyzes, for each image, data added to the image and determines the storage source. For example, as for an SNS image, the acquisition destination may be managed in an application by acquiring the image from the SNS via the application. Note that the image is not limited to the above-described images, and it may be another type of image.

The image analysis unit 212 executes image data analysis processing using a method to be described later for the image data acquired from the image acquisition unit 211, thereby acquiring information indicating an image feature amount to be described later. More specifically, for example, the image analysis unit 212 executes object recognition processing to be described later and acquires information indicating the image feature amount of image data. Also, the image analysis unit 212 links the acquired information indicating the image feature amount with the image data and outputs it to the layout unit 217.

The skeleton acquisition unit 213 acquires, from the HDD 104, one or a plurality of skeletons that match the conditions designated by the poster creation condition designation unit 201, the text designation unit 202, and the image acquisition unit 211. In this embodiment, a skeleton is information indicating the arrangement of character strings, images, and graphics to be arranged on a poster. In this embodiment, the skeleton is one of commercial material constituent elements that constitute a commercial material together with a coloring pattern and a font.

FIGS. 3A and 3B are views showing an example of a skeleton. On a skeleton 301 shown in FIG. 3A, three graphic objects 302, 303, and 304, one image object 305, and four character objects 306, 307, 308, and 309 that are objects to arrange characters are arranged. In each object, not only a position indicating a location to arrange the object, a size, and an angle but also metadata necessary for generating a poster are recorded. FIG. 3B is a view showing an example of metadata. For example, each of the character objects 306 to 309 holds, as the attribute of metadata, what kind of character information is to be arranged. Here, it is indicated that a title is arranged in the character object 306, a subtitle is arranged in the character object 307, and a text is arranged in each of the character objects 308 and 309. In addition, each of the graphic objects 302 to 304 holds the shape of a graphic and a coloring number (coloring ID) indicating a coloring pattern as the attribute of metadata. Here, it is indicated that the attribute of each of the graphic objects 302 and 303 is rectangle, and the attribute of the graphic object 304 is ellipse. Assume that coloring number 1 is assigned to the graphic object 302, and coloring number 2 is assigned to the graphic objects 303 and 304. Here, the coloring number is information to be referred to in coloring to be described later, and a different coloring number indicates that a different color is assigned. Note that the types of objects and metadata are not limited to these. For example, there may be a map object used to arrange a map or a barcode object used to arrange a QR Code® or a barcode. Also, as the metadata of a character object, there may be metadata indicating the width between rows or the width between characters. The metadata may include the application purpose of the skeleton and may be used to control whether the skeleton is usable in accordance with the application purpose.

The skeleton may be stored in the HDD 104 using, for example, a CSV format, or may be stored using a DB format such as SQL. The skeleton acquisition unit 213 outputs the one or the plurality of skeletons acquired from the HDD 104 to the skeleton selection unit 214.

Among the skeletons acquired from the skeleton acquisition unit 213, the skeleton selection unit 214 selects one or a plurality of skeletons matching the target impression designated by the target impression designation unit 204, and outputs these to the layout unit 217. Since the arrangement on the entire poster is decided by the skeleton, variations of the poster after generation can be increased by preparing various types of skeletons in advance.

The coloring pattern selection unit 215 acquires, from the HDD 104, one or a plurality of coloring patterns matching the target impression designated by the target impression designation unit 204, and outputs these to the layout unit 217. The coloring pattern is a combination of colors to be used in a poster.

FIG. 4 is a view showing an example of a table of coloring patterns. In this embodiment, the coloring pattern is represented as a combination of four colors. The column of coloring IDs in FIG. 4 show IDs each used to uniquely specify a coloring pattern. The columns of colors 1 to 4 show colors each represented by RGB values of 0 to 255 arranged in this order ((R, G, B)=(0 to 255, 0 to 255, 0 to 255)). Note that in this embodiment, coloring patterns each formed by a combination of four colors are used, but the number of colors may be changed, or a plurality of numbers of colors may coexist.

The font selection unit 216 acquires, from the HDD 104, one or a plurality of font patterns matching the target impression designated by the target impression designation unit 204, and outputs these to the layout unit 217. The font pattern is a combination of at least one of the font of a title, the font of a subtitle, and the font of a text.

The layout unit 217 lays out various kinds of data on each of the one or the plurality of skeletons acquired from the skeleton selection unit 214, thereby generating one or a plurality of poster data more than the designated number of created posters. The layout unit 217 arranges, on each skeleton, the text acquired from the text designation unit 202 and the image data acquired from the image analysis unit 212, applies the coloring pattern acquired from the coloring pattern selection unit 215, and applies the font pattern acquired from the font selection unit. The layout unit 217 outputs the plurality of generated poster data to the gamut mapping unit 221.

The device color gamut acquisition unit 220 acquires a color gamut (device color gamut) reproducible by a printer from printer information acquired from the printer designation unit 206. The device color gamut is defined by, for example, 729 points on CIE-L*a*b* and stored in the storage medium 125 of the printing apparatus 120. The image processing apparatus 100 acquires the device color gamut held by the printing apparatus 120 via the data communication unit 108 and stores it in the RAM 103. Note that the device color gamut acquisition method is not limited to this. For example, the device color gamut corresponding to the printer may be stored on the HDD 104 or a server (not shown) in advance, and the device color gamut acquisition unit 220 may acquire the device color gamut via the HDD 104 or the data communication unit 108. Instead of designating the printer, the printer designation unit 206 may designate an ICC profile. Sinde the ICC profile defines a color space that the device can express, the device color gamut acquisition unit 220 may acquire the device color gamut by analyzing the ICC profile. The acquired device color gamut is output to the gamut mapping unit 221.

The gamut mapping unit 221 acquires the gamut mapping method to be used from the gamut mapping designation unit 207, and it acquires the device color gamut from the device color gamut acquisition unit 220. For the plurality of poster data acquired from the layout unit 217, the gamut mapping unit 221 performs gamut mapping processing using the designated one or plurality of gamut mapping methods. The gamut mapping unit 221 outputs the poster data after the gamut mapping to the impression estimation unit 218.

For the plurality of poster data acquired from the gamut mapping unit 221, the impression estimation unit 218 estimates the impression of each poster and links the estimated impression with each poster. The impression estimation unit 218 outputs the plurality of poster data each linked with the estimated impression to the poster selection unit 219.

The poster selection unit 219 compares the target impression designated by the target impression designation unit 204 with the estimated impression of each of the plurality of poster data linked with the estimated impression acquired from the impression estimation unit 218, and it selects poster data linked with the estimated impression closest to the target impression. The selection result is stored in the HDD 104. The poster selection unit 219 outputs the selected poster data to the poster display unit 205.

The poster display unit 205 outputs a poster image to be displayed on the display 105 in accordance with the poster data acquired from the poster selection unit 219. The poster image is, for example, bitmap data. The poster display unit 205 displays the poster image on the display 105. Note that a function of, after the generation result is displayed on the poster display unit 205, editing the arrangement, colors, and shapes, and the like of the images, texts, and graphics by an additional operation of the user to change the design to a design demanded by the user may be imparted to the poster creation application. The printing unit 208 prints the poster data stored in the HDD 104 by the printer designated by the printer designation unit 206.

Example of Display Screen

Figure 5:
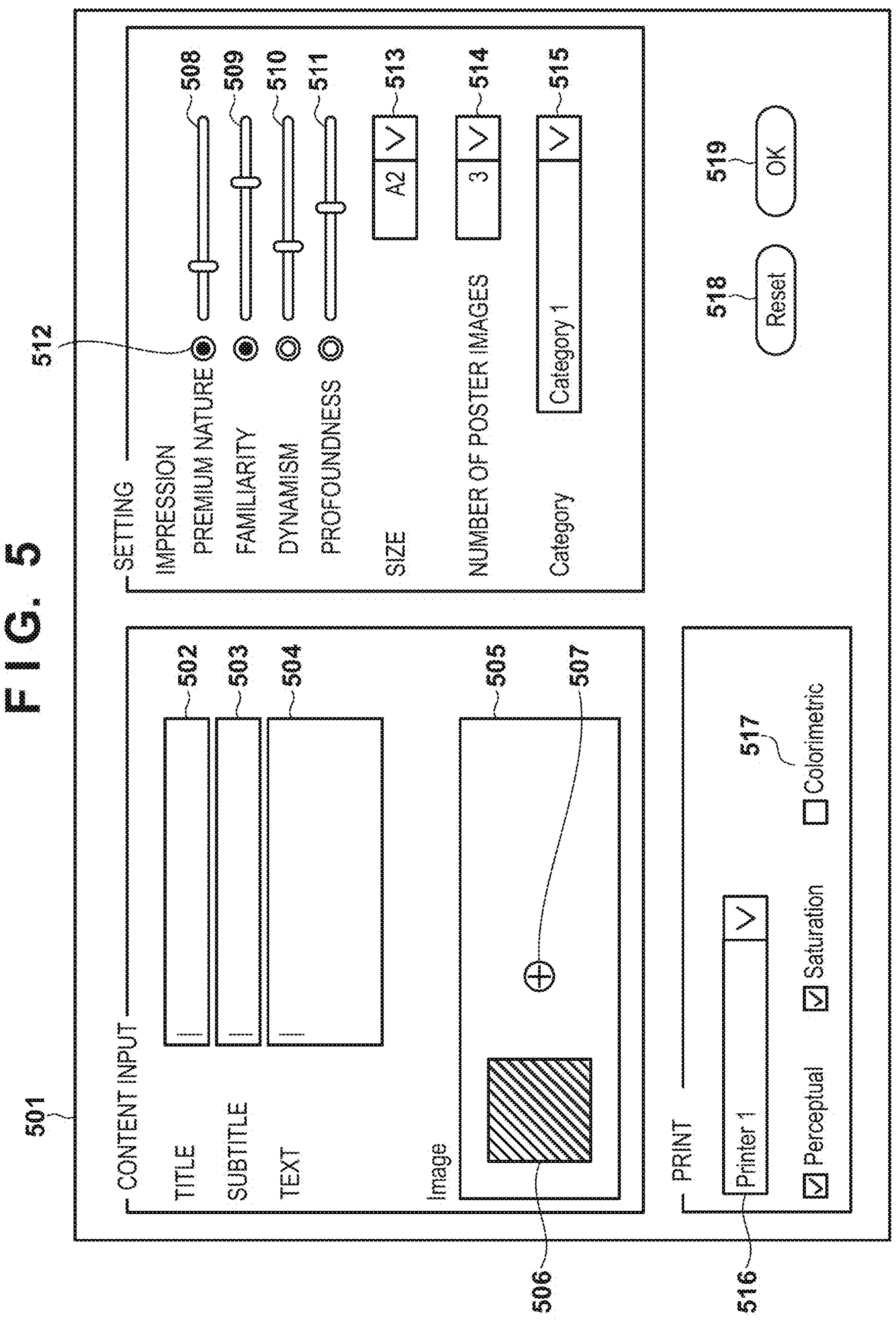
FIG. 5 is a view showing an application activation screen.

FIG. 5 is a view showing an example of an application activation screen 501 provided by the poster creation application. The application activation screen 501 is displayed on the display 105. The user designates poster creation conditions to be described later and texts and images as contents via the application activation screen 501, and the poster creation condition designation unit 201, the image designation unit 203, and the text designation unit 202 acquire the set contents from the user via the UI screen.

A title box 502, a subtitle box 503, and a text box 504 each accept a designation of character information to be arranged on a poster. Note that in this embodiment, three types of character information are accepted as an example, but the present invention is not limited to this. For example, character information of a location, a date/time, or the like may additionally be accepted. In addition, not all designations need to be done, and some boxes may be blank.

An image designation region 505 is a region in which an image to be arranged on the poster is displayed. An image 506 indicates the thumbnail of a designated image. An image addition button 507 is a bottom used to add an image to be arranged on the poster. If the user presses the image addition button 507, the image designation unit 203 displays a dialog screen used to select a file stored in the HDD 104 and accepts image file selection by the user. The thumbnail of the selected image is then added to the image designation region 505.

Impression sliders (impression slider bars or impression setting sliders) 508 to 511 are objects that set the factors of target impressions of the poster to be created. For example, the slider 508 is a slider that sets the factor of a target impression concerning a premium nature. If the slider 508 is moved to the right side, the premium nature is set high. If the slider 508 is moved to the left side, a target impression is set such that the poster has a low premium nature (gives a cheap impression). Also, when the factors of target impressions set by the sliders are combined, a target impression is set on which not only the factor of target impression set by one slider but also the factors of target impressions set by other sliders are reflected. For example, if a user operation is performed on the screen of the poster creation application to set the impression slider 508 to the right side of the center of the slider and set the impression slider 511 to the left side of the center of the slider, a poster giving a refined impression with a high premium nature and a low profoundness is generated. In addition, for example, if the impression slider 508 is set to the right side of the center of the slider, and the impression slider 511 is set to the right side of the center of the slider, a poster giving a gorgeous impression in which both the premium nature and the profoundness are high is generated. As described above, when the factors of target impressions indicated by the plurality of impression sliders are combined, even if a factor of a common target impression "high premium nature" is set, target impressions of different directions, that is, a "refined" target impression and a "gorgeous" target impression can be set. That is, the target impression can be formed and decided by a plurality of factors representing impressions but may be decided by one factor representing an impression. In this embodiment, defining a state in which a slider is set at the leftmost position as "−2" and a state in which a slider is set at the rightmost position as "+2", the value is corrected to an integer value of −2 to +2. As for these numerical values indicating impressions, "−2" indicates "low", "−1" indicates "somewhat low", "0" indicates "neither", "+1" indicates "somewhat high", and "+2" indicates "high". Note that the purpose for correcting to −2 to +2 is to facilitate a distance calculation to be described later by making the scale match the estimated impression. However, the present invention is not limited to this, and normalization may be done using values 0 to 1.

A radio button 512 is a button capable of executing control of enabling or disabling the setting of each target impression. The user can set whether to enable or disable the setting of each target impression by pressing the radio button 512 to set on/off. For example, if off is selected by the radio button 512, the impression is excluded from control of impression. For example, if the user wants to create a restrained poster with a low dynamism but has no particular designations concerning other impressions, a poster specialized to the low dynamism can be generated by turning off the radio buttons 512 other than that for the dynamism. Note that FIG. 5 shows a state in which on is selected for the premium nature and the familiarity, and off is selected for the dynamism and the profoundness. This makes it possible to flexibly control whether to use all target impressions for poster generation or use only some target impressions for poster generation. Note that the radio buttons 512 may be omitted if each target impression can be disabled by setting a corresponding slider at the leftmost position (for example, if the slider 508 is set at the leftmost position, the premium nature is set to 0). In this case, when disabling the setting of each target impression, the user can disable the setting of each target impression by setting the slider at the leftmost position.

A size list box 513 is a list box that sets the size of the poster to be created. By a click operation of the user using the pointing device 107, a list of creatable poster sizes is displayed, and a poster size can be selected. A creation count box 514 can set the number of candidates of the poster to be created. A category list box 515 can set the application purpose category of the poster to be created. A printer designation box 516 can set a printer that prints the created poster. Note that although a printer is designated in this embodiment, a print mode may further be designated. In this case, even if the color gamut that the printer can express changes depending on the print mode (the printing method or the paper type), an appropriate device color gamut can be acquired.

A gamut mapping designation region 517 is formed by a plurality of checkboxes used to decide the type of gamut mapping method to be used. By a click operation of the user using the pointing device 107, the checkbox of the gamut mapping method to be used can be enabled or disabled.

A reset button 518 is a button used to reset the setting information on the application activation screen 501. If the user presses an OK button 519, the poster creation condition designation unit 201, the text designation unit 202, the image designation unit 203, and the target impression designation unit 204 output the contents set on the application activation screen 501 to the poster generation unit 210. At this time, the poster creation condition designation unit 201 acquires the size of the poster to be created from the size list box 513, the number of posters to be created from the creation count box 514, and the application purpose category of the poster to be created from the category list box 515.

The text designation unit 202 acquires character information to be arranged on the poster from the title box 502, the subtitle box 503, and the text box 504. The image designation unit 203 acquires the path of an image file to be arranged on the poster from the image designation region 505. The target impression designation unit 204 acquires the target impression of the poster to be created from the impression sliders 508 to 511 and the radio buttons 512. Note that the poster creation condition designation unit 201, the text designation unit 202, the image designation unit 203, and the target impression designation unit 204 may process the values set on the application activation screen 501. For example, the text designation unit 202 may remove an unnecessary blank character at the top or end of the input character information. Also, the target impression designation unit 204 may correct the values of the target impressions designated by the impression sliders 508 to 511.

Figure 6:
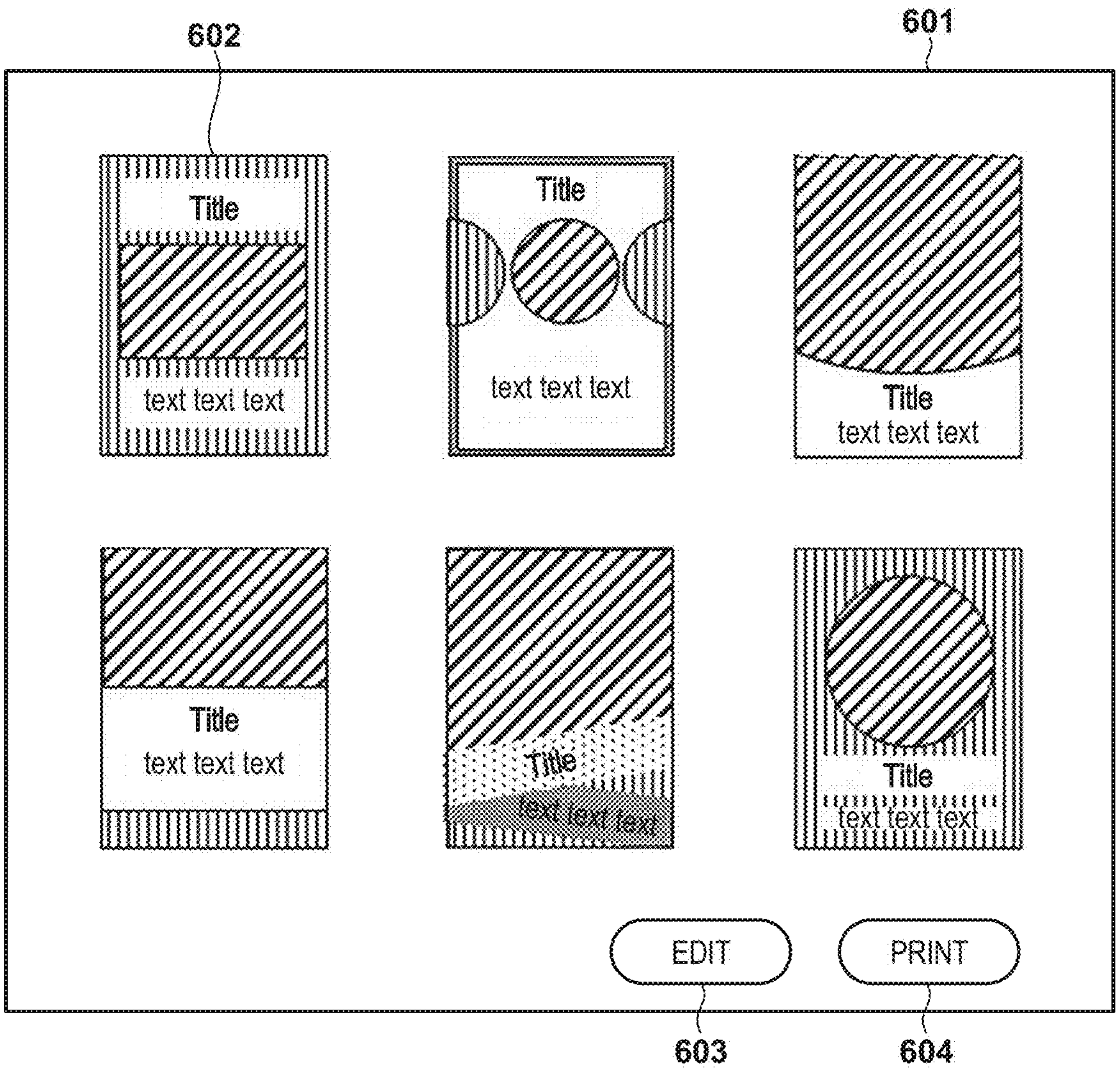
FIG. 6 is a view showing a poster preview screen.

FIG. 6 is a view showing an example of a poster preview screen in which the poster images generated by the poster display unit 205 are displayed on the display 105. When the OK button 519 on the application activation screen 501 is pressed, and poster generation is completed, the screen displayed on the display 105 changes to a poster preview screen 601.

A poster image 602 is a poster image output by the poster display unit 205. Since the poster generation unit 210 generates posters in number equal to or more than the creation count designated by the poster creation condition designation unit 201, the generated posters are displayed in a list as the poster images 602 on the poster preview screen 601. For example, if the user clicks a poster using the pointing device 107, the poster is selected.

An edit button 603 can edit the poster in the selected state via a UI (not shown) that provides an editing function. A print button 604 can print the poster in the selected state by the printing apparatus 120.

<Impression Quantification of Poster>

A method of processing of quantifying the impression of a poster, which is preprocessing for executing impression estimation processing to be described later in S913 of FIG. 9A and is necessary for poster generation processing, will be described here. The processing of quantifying the impression of a poster is performed at the development stage of the poster creation application by a vendor that develops the poster creation application. Note that the processing of quantifying the impression of a poster may be executed by the poster generation apparatus 100, or it may be executed by an information processing apparatus different from the poster generation apparatus 100. Note that if the processing is executed by the information processing apparatus different from the poster generation apparatus 100, it is executed by the CPU of the information processing apparatus.

In the processing of quantifying the impression of a poster, an impression that a person has concerning various posters is quantified. At the same time, the correspondence relationship between a poster image and the impression of the poster is derived. This makes it possible to estimate the impression of the poster from the generated poster image. If the impression can be estimated, the impression of the poster can be controlled by correcting the poster image, or a poster image having a certain target impression can be searched for. Note that the poster impression quantification processing is executed by, for example, operating, in the poster generation apparatus, an impression learning application configured to learn the impression of a poster image in advance before poster generation processing.

Figure 7:
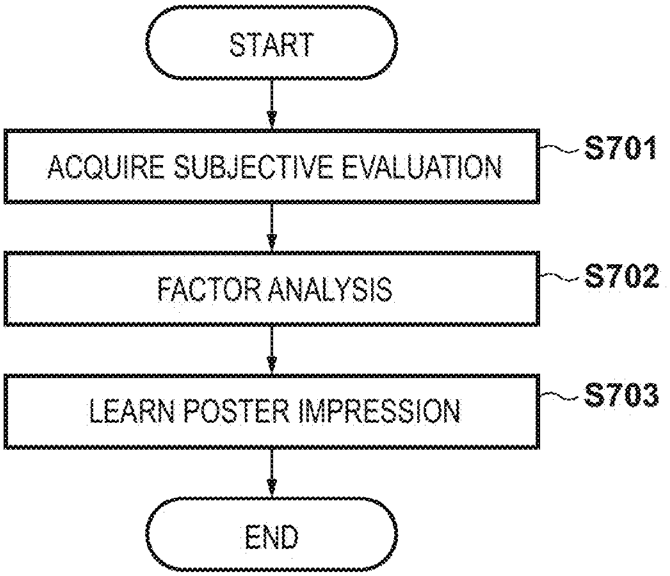
FIG. 7 is a flowchart showing impression quantification processing.

FIG. 7 is a flowchart showing poster impression quantification processing. The flowchart shown in FIG. 7 is implemented by, for example, the CPU 101 reading out a program stored in the HDD 104 to the RAM 103 and executing it. The poster impression quantification processing will be described with reference to FIG. 7. The processing shown in FIG. 7 is executed. Note that a symbol "S" in a description of each process means that it is a step in the flowchart (the same applies hereafter).

Figure 8:
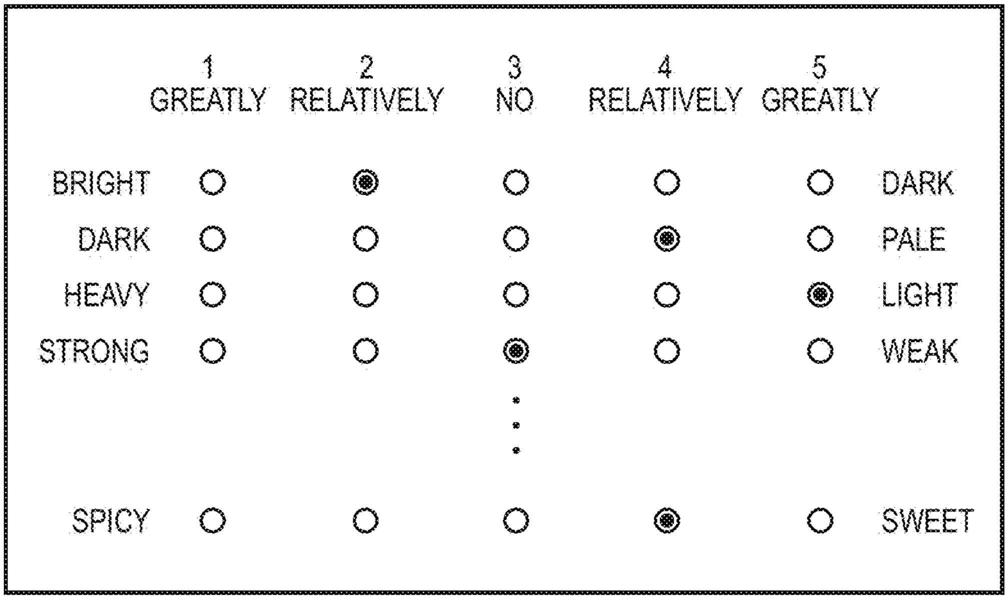
FIG. 8 is a view for explaining a subjective evaluation method for an impression.

In S701, the CPU 101 executes acquisition of subjective evaluation of the impression of a poster. FIG. 8 is a view for explaining an example of a subjective evaluation method for the impression of a poster. The CPU 101 presents a poster to a subject and acquires subjective evaluation of the impression of the poster from the subject. At this time, a measurement method such as the Semantic Differential (SD) method or the Likert scale method can be used. FIG. 8 shows an example of a questionnaire using the SD method. This is a questionnaire that presents adjective pairs expressing impressions to a plurality of evaluators and executes scoring concerning adjective pairs suggested from the target poster. After subjective evaluation results for a plurality of posters are acquired from the plurality of evaluators, the CPU 101 calculates the average value of answers for each adjective pair and thus obtains the average value as the representative score value of the corresponding adjective pair. Note that the subjective evaluation method for an impression may be any method other than the SD method if a word expressing an impression and a score corresponding to it are determined.

In S702, the CPU 101 executes factor analysis of the acquired subjective evaluation result. If the subjective evaluation result is directly used, the number of adjective pairs is the number of dimensions, and control is complex. It is therefore preferable to decrease the number of dimensions to an efficient number by an analysis method such as principal component analysis or factor analysis. In this embodiment, a description will be made assuming that the dimensions are decreased to four factors by factor analysis. This number changes depending on selection of adjective pairs in subjective evaluation and the factor analysis method, as a matter of course. Also, the output of factor analysis is standardized. That is, each factor is scaled such that the average is 0, and the variance is 1 in the poster used for analysis. Hence, −2, −1, 0, +1, and +2 of an impression designated by the target impression designation unit 204 can directly be made to correspond to −2σ, −1σ, average value, +1σ, and +2σ of each impression, respectively, and calculation of the distance between a target impression and an estimated impression to be described later is facilitated. Note that in this embodiment, a premium nature, a familiarity, a dynamism, and a profoundness shown in FIG. 5 are used as the four factors. These are names given for the sake of convenience to transmit impressions to the user via the user interface, and each factor is constituted by the plurality of adjective pairs affecting each other.

In S703, the CPU 101 associates a poster image with an impression. Quantification can be performed for the poster that has undergone the subjective evaluation of the above-described method, but an impression needs to be estimated without subjective evaluation even for a poster to be created from now on. Associating between a poster image and an impression can be implemented by learning a model for estimating an impression from a poster image using, for example, a deep learning method using a Convolution Neural Network (CNN) or a machine learning method using a decision tree. In this embodiment, in impression learning, supervised deep learning using a CNN is performed using a poster image as an input and four factors as outputs. That is, a deep learning model is created by performing learning using a poster image that has undergone subjective evaluation and a corresponding impression as a correct answer, and an unknown poster image is input to the learning model, thereby estimating the impression.

Note that the deep learning model created above is stored in, for example, the HDD 104, and the impression estimation unit 218 deploys the deep learning model stored in the HDD 104 onto the RAM 103 and executes it. The impression estimation unit 218 forms an image from poster data acquired from the layout unit 217, and estimates the impression of the poster by operating, by the CPU 101 or the GPU 109, the deep learning model deployed on the RAM 103. Note that in this embodiment, the deep learning method is used, but the present invention is not limited to this. For example, if a machine learning method such as a decision tree is used, a feature amount such as a luminance average value or an edge amount of a poster image may be extracted by image analysis, and a machine learning model that estimates an impression based on the feature amount may be created.

Figure 9A:
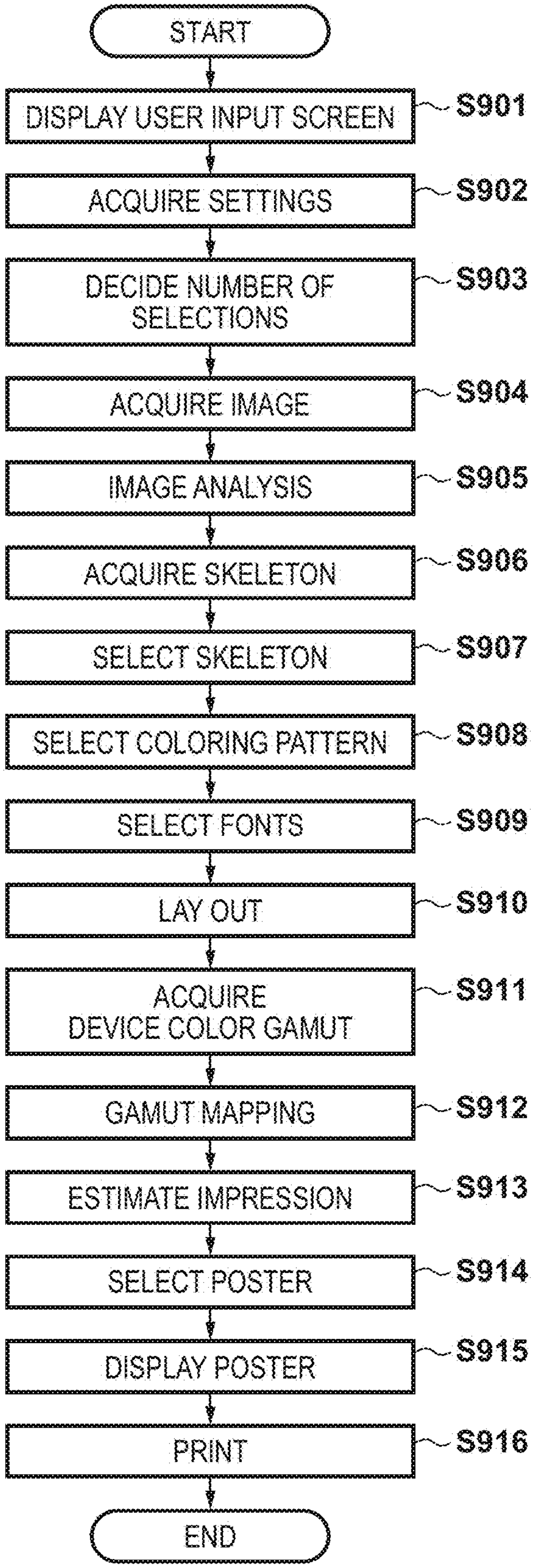
FIGS. 9A and 9B are flowcharts showing poster generation processing.
Figure 9B:
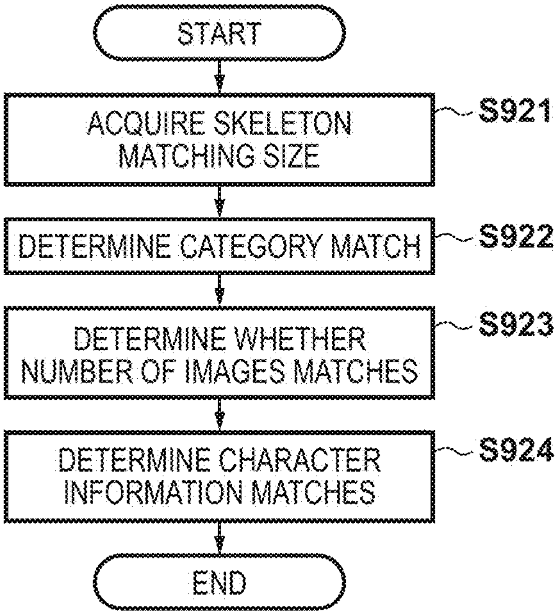

FIGS. 9A and 9B are flowcharts showing poster generation processing by the poster generation unit 210 of the poster creation application. The flowcharts shown in FIGS. 9A and 9B are started when the user does the settings of various kinds of setting items on the poster creation application and presses the OK button 519, as described above.

The flowchart shown in FIG. 9A is implemented by, for example, the CPU 101 reading out a program stored in the HDD 104 to the RAM 103 and executing it. In this embodiment, a description will be made assuming that the constituent elements shown in FIG. 2, which function when the CPU 101 executes the poster creation application, execute the processing. Poster generation processing will be described with reference to FIGS. 9A and 9B. Note that a symbol "S" in a description of each process means that it is a step in the flowchart (the same applies hereafter).

In S901, the poster creation application displays the application activation screen 501 on the display 105. The user inputs each setting via the UI screen of the application activation screen 501 using the keyboard 106 or the pointing device 107.

In S902, the poster creation condition designation unit 201, the text designation unit 202, the image designation unit 203, and the target impression designation unit 204 acquire corresponding settings from the application activation screen 501.

In S903, the skeleton selection unit 214, the coloring pattern selection unit 215, and the font selection unit 216 decide the number of skeletons, the number of coloring patterns, and the number of fonts, respectively, to be selected in accordance with the creation count designated by the poster creation condition designation unit 201. In this embodiment, the layout unit 217 generates poster data as many as the number of skeletons×the number of coloring pattern×the number of fonts by a method to be described later. The number of skeletons, the number of coloring patterns, and the number of fonts to be selected are decided such that the number of posters to be generated at this time exceeds the creation count. In this embodiment, for example, the number of skeletons, the number of coloring patterns, and the number of fonts are decided in accordance with $$\text{selection count} = \left\lceil \sqrt[3]{\text{creation count} \times 2} \right\rceil \tag{1}$$

For example, if the creation count is 6, the selection count is 3. The number of poster data generated by the layout unit 217 is 3×3×3=27, and the poster selection unit 219 selects six poster data among these. Thus, the poster selection unit 219 can select posters having general impressions more matching the target impression from the poster data generated in number equal to or more than the creation count.

In S904, the image acquisition unit 211 acquires image data. More specifically, the image acquisition unit 211 reads out an image file in the HDD 104, which is designated by the image designation unit 203, to the RAM 103.

In S905, the image analysis unit 212 executes analysis processing for the image data acquired in S904 and acquires information indicating a feature amount. Examples of the information indicating a feature amount are metainformation stored in the image and information indicating an image feature amount that can be acquired by analyzing the image. These pieces of information are used in object recognition processing that is analysis processing. Note that in this embodiment, object recognition processing is executed as the analysis processing, but the present invention is not limited to this, and another analysis processing may be executed. Furthermore, the process of S905 may be omitted. Details of processing performed by the image analysis unit 212 in S905 will be described below.

The image analysis unit 212 executes object recognition processing for the image acquired in S904. Here, a known method can be used for the object recognition processing. In this embodiment, an object is recognized by a discriminator created by Deep Learning. The discriminator outputs a likelihood indicating whether a pixel forming an image is a pixel forming an object as a value of 0 to 1, and it recognizes that an object exceeding a threshold exists in the image. The image analysis unit 212 recognizes an object image, thereby acquiring a type of an object such as a face, a pet such as a dog or a cat, a flower, a food, a building, an ornament, or a landmark, and a position thereof.

In S906, the skeleton acquisition unit 213 acquires a skeleton matching various kinds of set conditions. In this embodiment, one skeleton is described in one file and stored in the HDD 104. The skeleton acquisition unit 213 sequentially reads out skeleton files from the HDD 104 to the RAM 103, leaves skeletons matching the conditions on the RAM 103, and erases skeletons not matching the conditions from the RAM 103.

Here, FIG. 9B is a flowchart of condition determination processing performed by the skeleton acquisition unit 213. Condition determination processing of the skeleton acquisition unit 213 will be described with reference to FIG. 9B.

In S921, concerning a skeleton loaded into the RAM 103, the skeleton acquisition unit 213 determines whether the poster size 513 designated by the poster creation condition designation unit 201 matches the size of the skeleton. Note that matching of sizes is confirmed here, but matching of aspect ratios may suffice. In this case, the skeleton acquisition unit 213 enlarges or reduces the coordinate system of the loaded skeleton, thereby acquiring a skeleton matching the poster size designated by the poster creation condition designation unit 201.

In S922, the skeleton acquisition unit 213 determines whether the application purpose category 515 designated by the poster creation condition designation unit 201 matches the category of the skeleton. For a skeleton to be used only for a specific application purpose, the application purpose category is described in the skeleton file, and the skeleton is not acquired unless the application purpose category is selected. This prevents the skeleton from being used in other application purpose categories in a case where the design of the skeleton is specialized for a specific application purpose, for example, in a case where a pattern reminding a school is drawn by a graphic, or a pattern of a sports gear is drawn. Note that if no application purpose category is set on the application activation screen 501, S922 is skipped.

In S923, the skeleton acquisition unit 213 determines whether the number of image objects in the loaded skeleton matches the number of images acquired by the image acquisition unit 211.

In S924, the skeleton acquisition unit 213 determines whether a character object in the loaded skeleton matches the character information designated by the text designation unit 202. More specifically, the skeleton acquisition unit 213 determines whether the type of character information designated by the text designation unit 202 exists in the skeleton. For example, assume that character strings are designated in the title box 502 and the text box 504 on the application activation screen 501, a blank field is designated in the subtitle box 503. In this case, all character objects in the skeleton are searched for, if both a character object for which "title" is set as the type of character information of metadata and a character object for which "text" is set are found, it is determined that the character objects match, and otherwise, it is determined that the character objects do not match.

As described above, the skeleton acquisition unit 213 holds, on the RAM 103, skeletons for which all the skeleton size, the application purpose category, the number of image objects, and the types of character objects match the set conditions. Note that in this embodiment, the skeleton acquisition unit 213 determines all skeleton files on the HDD 104, but the present invention is not limited to this. For example, the poster creation application may hold, on the HDD 104, a database that associates the file path of each skeleton file with the search conditions (the skeleton size, the number of image objects, and the types of character objects). In this case, the skeleton acquisition unit 213 loads only matching skeleton files found as the result of search on the database from the HDD 104 to the RAM 103, thereby acquiring the skeleton files at a high speed. The explanation will return to FIG. 9A.

Figures 10A, 10B, 10C:
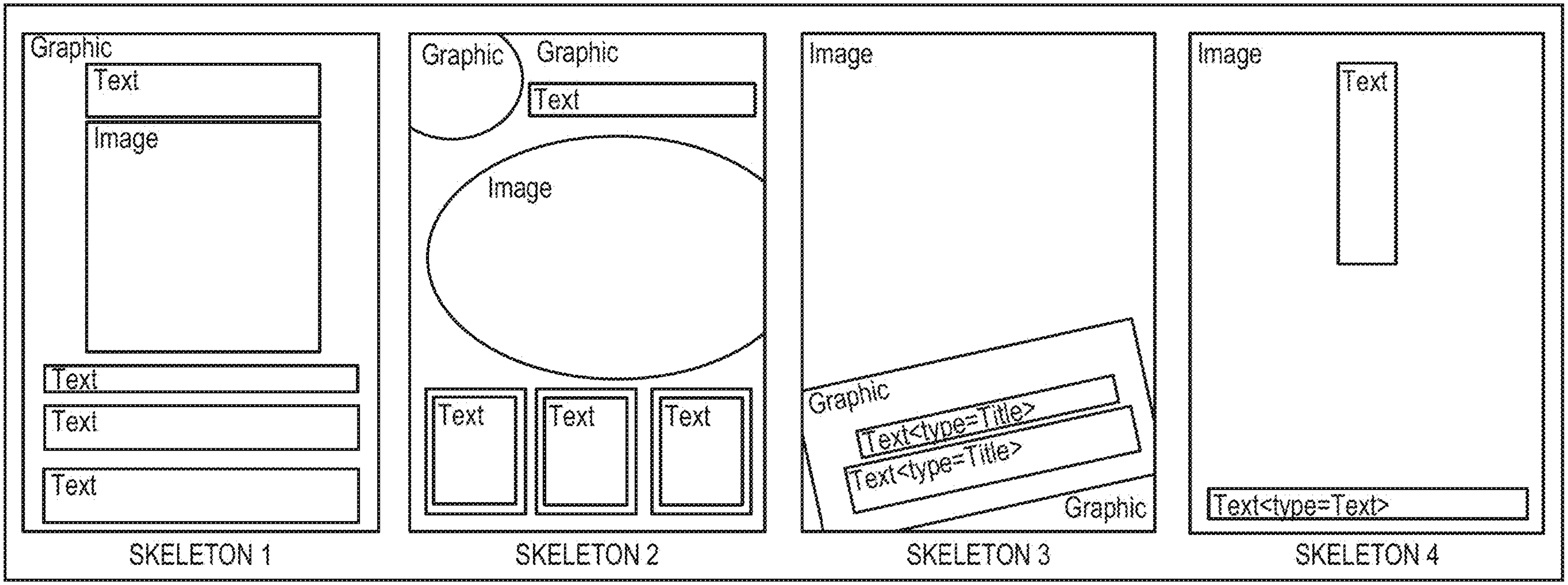
FIGS. 10A to 10C are views for explaining selection of a skeleton.

In S907, the skeleton selection unit 214 selects a skeleton matching the target impression designated by the target impression designation unit 204 among the skeletons acquired in S906. Here, FIGS. 10A to 10C are views for explaining a method of selecting a skeleton by the skeleton selection unit 214. FIG. 10A is a view showing an example of a table that links skeletons with impressions. The file names of skeletons are described in the column of skeleton names in FIG. 10A, and the columns of a premium nature, a familiarity, a dynamism, and a profoundness show numbers (numerical values) each indicating the degree of influence the skeleton gives to the impression. As for these numerical values, "-2" indicates "low", "−1" indicates "somewhat low", "0" indicates "neither", "+1" indicates "somewhat high", and "+2" indicates "high" for the impression. First, the skeleton selection unit 214 calculates the distance between the target impression acquired from the target impression designation unit 204 and the impression of each skeleton shown in the skeleton impression table of FIG. 10A. For example, if the target impression is "premium nature +1, familiarity −1, dynamism −2, and profoundness +2", distances shown in FIG. 10B are obtained as the distances calculated by the skeleton selection unit 214. Note that in this embodiment, a Euclidean distance is used as the distance (a simple distance is a Euclidean distance hereinafter). The smaller the value indicated by the Euclidean distance is, the closer the target impression and the impression of the skeleton are. Next, the skeleton selection unit 214 selects N high-rank skeletons for which the values indicating distances in FIG. 10B are small. In this embodiment, the skeleton selection unit 214 selects two high-rank skeletons. In this example, the skeleton selection unit 214 selects skeleton 1 and skeleton 4.

Here, as for a method of setting N, a fixed value may be set, or the value may be changed depending on the conditions designated by the poster creation condition designation unit 201. For example, if a creation count of 6 is set in the creation count box 514 on the application activation screen 501, the poster generation unit 210 generates six posters. The layout unit 217 to be described later generates posters by combining skeletons, coloring patterns, and fonts selected by the skeleton selection unit 214, the coloring pattern selection unit 215, and the font selection unit 216. For this reason, since 2×2×2=8 posters can be generated by selecting, for example, two skeleton, two coloring patterns, and two fonts, the condition that the creation count is 6 can be satisfied. In this way, the number N of skeletons to be selected may be decided in accordance with the conditions designated by the poster creation condition designation unit 201.

Also, the range of each impression in the skeleton impression table shown in FIG. 10A need not be the same as the range of the impression designated by the target impression designation unit 204. In this embodiment, the range of the impression designated by the target impression designation unit 204 is −2 to +2. However, the range of the impression in the skeleton impression table may be different from this. In this case, scaling is performed such that the range in the skeleton impression table matches the range of the target impression, and the distance calculation is performed after that. Also, the distance calculated by the skeleton selection unit 214 is not limited to the Euclidean distance, and any distance such as a Manhattan distance or a cosine similarity can be used if the distance between vectors can be calculated. Also, an impression for which the target impression is set to off by the radio button 512 is excluded from the distance calculation.

Note that the skeleton impression table is created in advance by, for example, fixing coloring patterns, fonts, and images and character data to be arranged on the skeletons, generating poster images based on the skeletons, and estimating impression thereof, and stored in the HDD 104. That is, the impressions of poster images in which the same character colors and the same images are used, but the arrangements of these are different are estimated, thereby forming a table showing the relative characteristics between the skeletons. At this time, processing of canceling the impression based on the used coloring pattern or image is preferably performed by standardizing the whole estimated impression or averaging the impressions of a plurality of poster images generated from one skeleton using a plurality of coloring patterns or images. This makes it possible to form a table of influences of arrangements on impressions in which, for example, the impression of a skeleton including a small image is determined not by the image but by an element such as a graphic or a character, and a high dynamism can be obtained if the arrangement of an image or characters is tilted. FIG. 10C shows an example of skeletons corresponding to skeletons 1 to 4 in FIG. 10A. For example, in skeleton 1, since an image object and character objects are periodically arranged, and the area of the image is small, the dynamism is low. In skeleton 2, since a graphic object and an image object have a circular shape, the familiarity is high, and the profoundness is low. In skeleton 3, since a large image object is arranged, and a tilting graphic object is overlaid on the image object, the dynamism is high. In skeleton 4, since an image is arranged all over the skeleton, and a character object is minimum, the profoundness is high, and the dynamism is low. If a poster image includes characters or an image, poster images of different target impressions are generated depending on the arrangement method of the characters or the image. Note that the skeleton impression table creation method is not limited to this, and the impression may be estimated from the feature itself of arrangement information such as the area or the coordinates of an image or a title character string, or it may be adjusted manually. The skeleton impression table is stored in the HDD 104, and the skeleton selection unit 214 reads out the skeleton impression table from the HDD 104 to the RAM 103 and refers to it.

In S908, the coloring pattern selection unit 215 selects a coloring pattern matching the target impression designated by the target impression designation unit 204. By the same method as in S906, the coloring pattern selection unit 215 refers to an impression table corresponding to coloring patterns and selects a coloring pattern in accordance with the target impression. FIG. 11A shows an example of a coloring pattern impression table that links coloring patterns with impressions. The coloring pattern selection unit 215 calculates the value of the distance between the target impression and the value of the distance of each of impressions indicated by the column of the premium nature to the column of the profoundness in FIG. 11A, and it selects N high-rank coloring patterns for which the values of the distances are small. In this embodiment, two high-rank coloring patterns are selected. Note that, like the skeleton impression table, the coloring pattern impression table can show, as a table, the tendencies of the impressions of the coloring patterns by fixing skeletons, fonts, and images other than the coloring patterns, creating posters in which the coloring pattern is changed, and estimating impressions.

In S909, the font selection unit 216 selects a combination of fonts matching the target impression designated by the target impression designation unit 204. By the same method as in S906, the font selection unit 216 refers to an impression table corresponding to fonts and selects a font in accordance with the target impression. FIG. 11B shows an example of a font impression table that links fonts with impressions. The font selection unit 216 calculates the value of the distance between the target impression and the value of the distance of each of impressions indicated by the column of the premium nature to the column of the profoundness in FIG. 11B, and it selects N high-rank fonts for which the values of the distances are small. Note that, like the skeleton impression table, the font impression table can show, as a table, the tendencies of the impressions of the fonts by fixing skeletons, coloring patterns, and images other than the fonts, creating posters in which the font is changed, and estimating impressions.

In S910, the layout unit 217 sets the character information, the images, the coloring patterns, and the fonts on the skeletons selected by the skeleton selection unit 214, and it generates posters.

Figure 12:
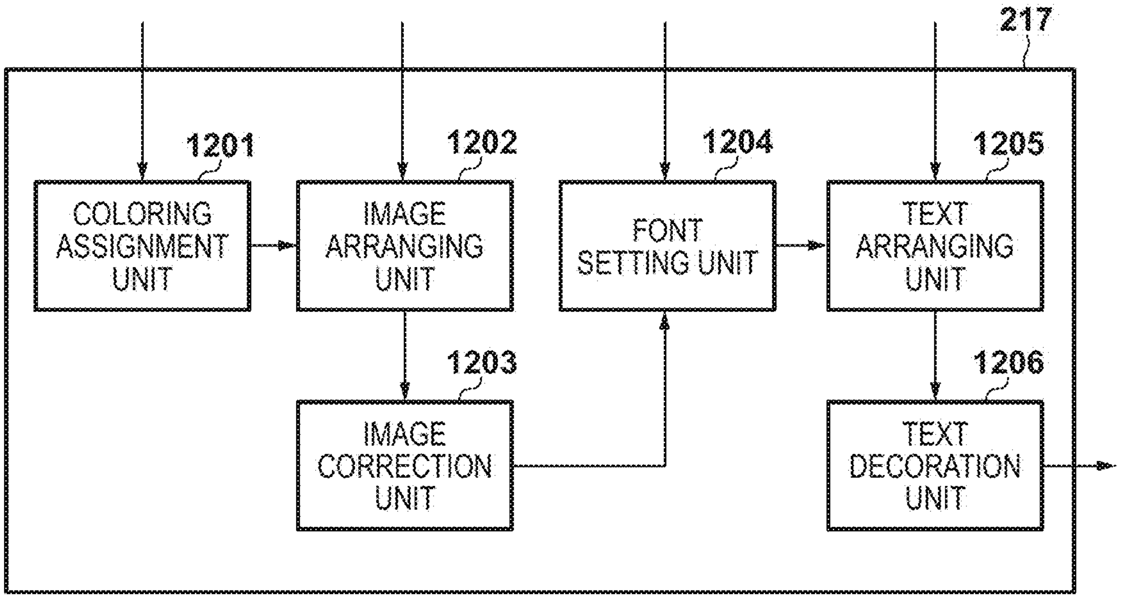
FIG. 12 is a software block diagram of a layout unit.
Figure 13:
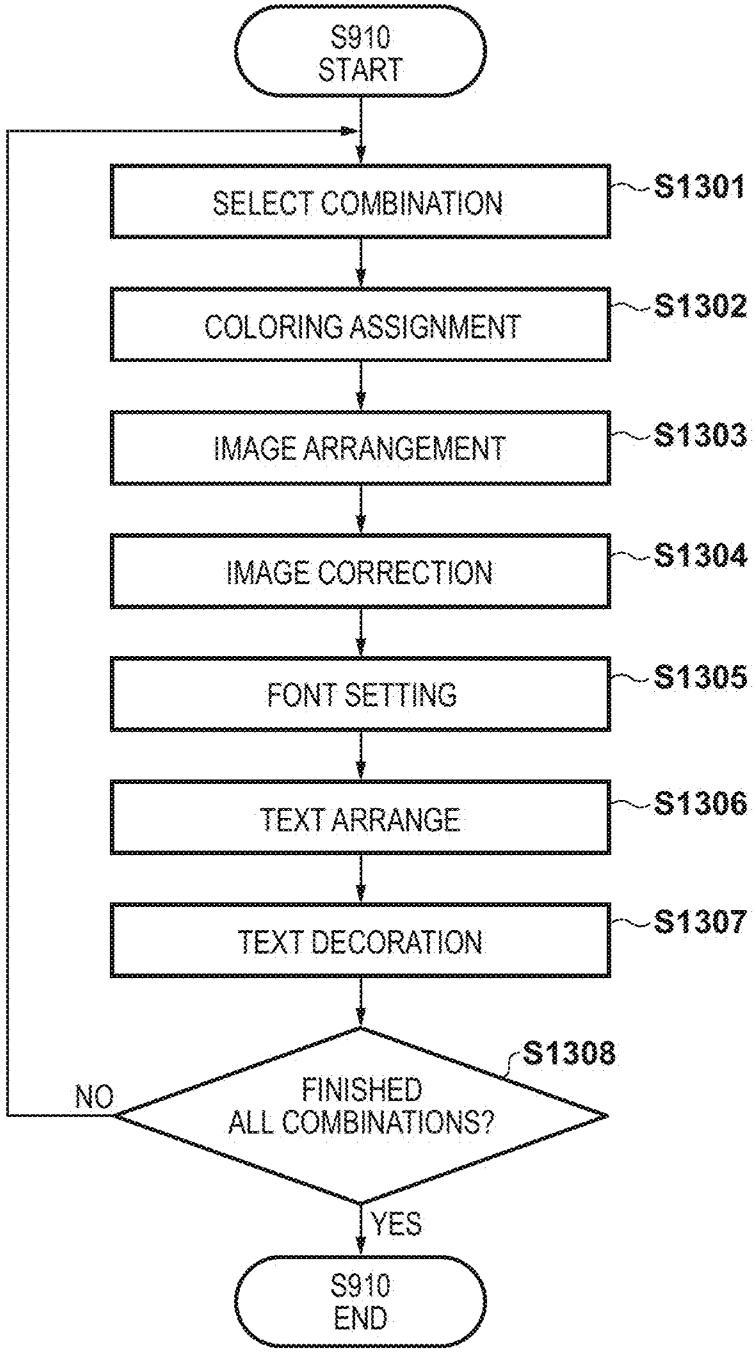
FIG. 13 is a flowchart showing the process of S910.
Figures 14A, 14B, 14C:
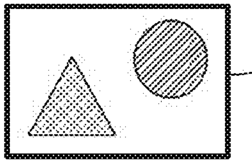
FIGS. 14A to 14C are views for explaining information input to the layout unit.
Figures 15A, 15B, 15C:
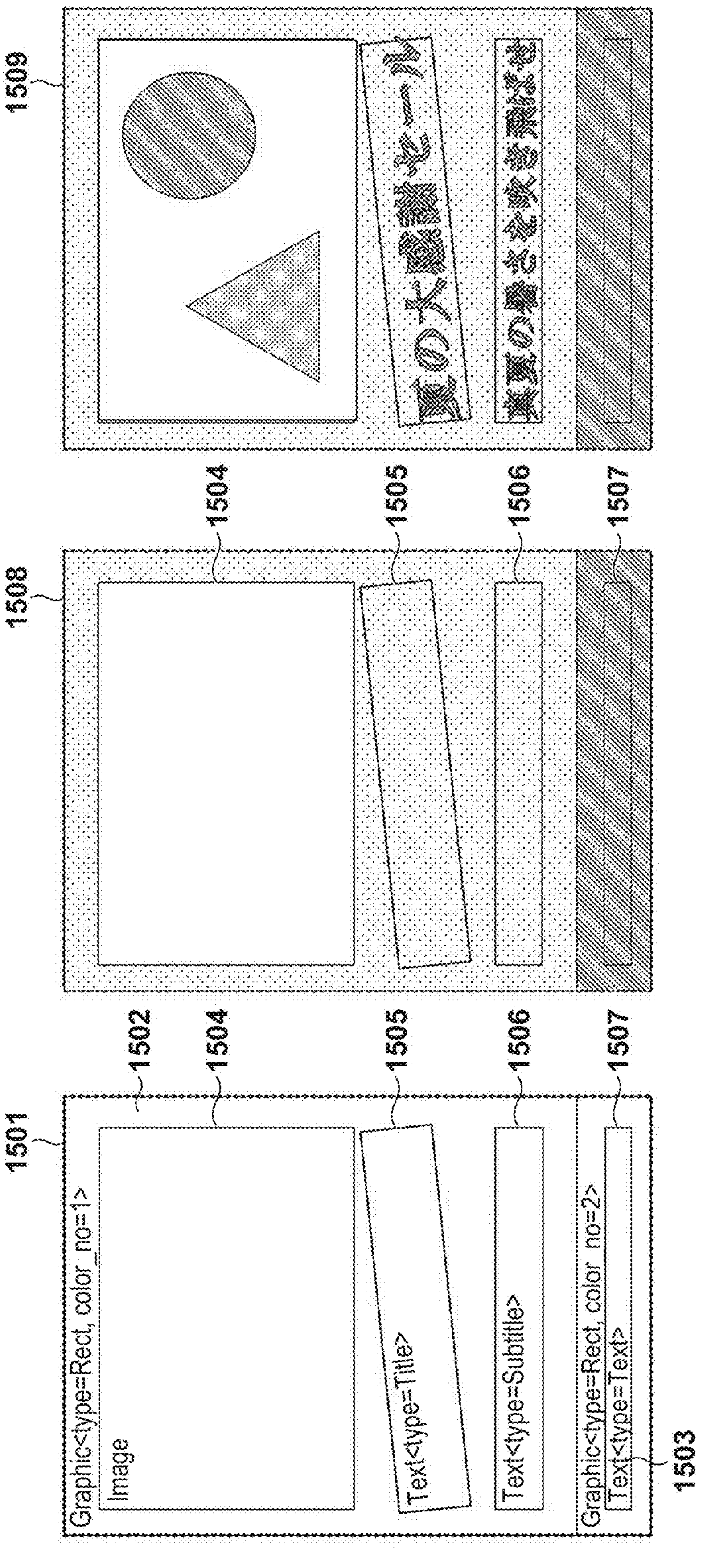
FIGS. 15A to 15C are views for explaining the process of processing of the layout unit.

S910 and processing of the layout unit 217 will be described next in detail with reference to FIGS. 12, 13, 14, and 15. FIG. 12 shows an example of a software block diagram for explaining the layout unit 217 in detail. The layout unit 217 is configured to include a coloring assignment unit 1201, an image arranging unit 1202, an image correction unit 1203, a font setting unit 1204, a text arranging unit 1205, and a text decoration unit 1206. FIG. 13 is a flowchart for explaining S910 in detail. FIGS. 14A to 14C are views for explaining information input to the layout unit 217. FIG. 14A is a table showing character information designated by the text designation unit 202 and an image designated by the image designation unit 203. FIG. 14B is an example of a table showing coloring patterns acquired from the coloring pattern selection unit 215, and FIG. 14C is an example of a table showing fonts acquired from the font selection unit 216. FIGS. 15A to 15C are views for explaining the process of processing of the layout unit 217.

First, S910 will be described in detail with reference to FIG. 13.

In S1301, the layout unit 217 lists all combinations of the skeletons acquired from the skeleton selection unit 214, the coloring patterns acquired from the coloring pattern selection unit 215, and the fonts acquired from the font selection unit 216. The layout unit 217 performs the following layout processing sequentially for the combinations, thereby generating poster data. For example, if the number of skeletons acquired from the skeleton selection unit 214 is 3, the number of coloring patterns acquired from the coloring pattern selection unit 215 is 2, and the number of fonts acquired from the font selection unit 216 is 2, the layout unit 217 generates 3×2×2=12 poster data. Next, in S1301, the layout unit 217 selects one of the listed combinations and executes the processes of S1302 to S1307.

In S1302, the coloring assignment unit 1201 assigns a coloring pattern acquired from the coloring pattern selection unit 215 to a skeleton acquired from the skeleton selection unit 214. FIG. 15A is a view showing an example of the skeleton. In this embodiment, an example in which the coloring pattern of coloring ID "1" in FIG. 14B is assigned to a skeleton 1501 shown in FIG. 15A will be described. The skeleton 1501 shown in FIG. 15A is formed by two graphic objects 1502 and 1503, one image object 1504, and three character objects 1505, 1506, and 1507. First, the coloring assignment unit 1201 performs coloring for the graphic objects 1502 and 1503. More specifically, a corresponding color is assigned from the coloring pattern based on a coloring number that is metadata described in each graphic object. Next, the coloring assignment unit 1201 assigns, for example, the final color of the coloring pattern to a character object for which the metadata is "type" and the attribute is "title" among the character objects. That is, in this embodiment, color 4 is assigned to characters arranged in the character object 1505. Next, for the characters arranged in the character object other than the character object for which the metadata is "type" and the attribute is "title" among the character objects, a character color is set based on the brightness of the background of the character object. In this embodiment, if the brightness of the background of the character object is equal to or less than a threshold, the character color is set to white. Otherwise, the character color is set to black. FIG. 15B is a view showing the state of a skeleton 1508 after the coloring assignment processing is performed. The coloring assignment unit 1201 outputs the skeleton data that has undergone the coloring to the image arranging unit 1202.

In S1303, the image arranging unit 1202 arranges, based on additional analysis information, the image data acquired from the image analysis unit 212 on the skeleton data acquired from the coloring assignment unit 1201. In this embodiment, the image arranging unit 1202 assigns image data 1401 to the image object 1504 in the skeleton. Also, if the aspect ratio of the image object 1504 and that of the image data 1401 are different, the image arranging unit 1202 performs trimming such that the aspect ratio of the image data 1401 matches that of the image object 1504. More specifically, trimming is performed based on the position of the object obtained by the image analysis unit 212 analyzing the image data 1401 such that the object region reduced by the trimming is minimum. Note that the trimming method is not limited to this, and another trimming method of, for example, trimming the center of the image or devising the composition such that face positions implement a triangular composition may be used. The image arranging unit 1202 outputs the skeleton data that has undergone the image arrangement to the image correction unit 1203.

In S1304, the image correction unit 1203 acquires the skeleton data that has undergone the image arrangement from the image arranging unit 1202 and performs correction for the image arranged on the skeleton. In this embodiment, if the resolution of the image is insufficient, up-sampling processing using super-resolution processing is performed. First, the image correction unit 1203 determines whether the image arranged on the skeleton satisfies a predetermined resolution. For example, assume that an image having a size of 1,600 px×1,200 px is assigned to a region having a size of 200 mm×150 mm on the skeleton. In this case, the print resolution of the image can be calculated by $$1600/(200/25.4) \approx 203[dpi] \tag{2}$$

Next, upon determining that the print resolution of the image is less than a threshold, the image correction unit 1203 raises the resolution by super-resolution processing. On the other hand, upon determining that the print resolution of the image is equal to or more than the threshold, and the resolution is sufficient, image correction is not particularly performed. In this embodiment, if the print resolution of the image is less than 300 dpi, super-resolution processing is performed.

In S1305, the font setting unit 1204 sets the font acquired from the font selection unit 216 for the skeleton data that has undergone the image correction, which is acquired from the image correction unit 1203. FIG. 14C shows an example of combinations of fonts selected by the font selection unit 216. In this embodiment, an example in which if the font to be assigned to the skeleton data that has undergone the image correction is font ID "2" shown in FIG. 14C, the font is assigned will be described. In this embodiment, fonts are set for the character objects 1505, 1506, and 1507 on the skeleton 1508. Note that in many cases, in a poster, a noticeable font is assigned to the title from the viewpoint of attractiveness, and a font easy to read is assigned to the remaining characters from the viewpoint of visibility. For this reason, in this embodiment, the font selection unit 216 selects two types of fonts including a title font and a text font. The font setting unit 1204 sets the title font for the character object 1505 whose attribute is "title" and the text font for the remaining character objects 1506 and 1507. The font setting unit 1204 outputs the skeleton data that has undergone the font setting to the text arranging unit 1205. Note that in this embodiment, the font selection unit 216 selects two type of fonts, but the present invention is not limited to this and, for example, only the title font may be selected. In this case, the font setting unit 1204 uses the font corresponding to the title font as the text font. That is, if the title uses a gothic-style font, a representative gothic font with high readability is selected even for the remaining character objects, and if the title uses a Mincho-style font, a representative Mincho font is selected even for the remaining character objects, that is, a text font that matches the type of title font is set. The title font and the text font may be the same, as a matter of course. Also, the fonts may selectively be used in accordance with the degree of making a font prominent such that, for example, the title font is used for the character objects of the title and the subtitle, and the text font is used for the remaining character objects, or the title font is used for a predetermined font size or more.

In S1306, the text arranging unit 1205 arranges the text designated by the text designation unit 202 on the skeleton data that has undergone the font setting, which is acquired from the font setting unit 1204. In this embodiment, each text shown in FIG. 14A is assigned by referring to the attribute of the metadata of each character object on the skeleton. That is, "summer thanksgiving bargain sale" whose attribute is "title" is assigned to the character object 1505, and "blow away the summer heat" whose attribute is "subtitle" is assigned to the character object 1506. Since no text is set, nothing is assigned to the character object 1507. FIG. 15C shows a skeleton 1509 that is an example of skeleton data after the processing of the text arranging unit 1205. The text arranging unit 1205 outputs the skeleton data that has undergone the text arrangement to the text decoration unit 1206.

In S1307, the text decoration unit 1206 adds a decoration to each character object in the skeleton that has undergone the text arrangement, which is acquired from the text arranging unit 1205. In this embodiment, if the color difference between the title characters and the background region thereof is equal to or less than a threshold, processing of adding an outline to the title characters is performed. This improves the readability of the title. The text decoration unit 1206 outputs the decorated skeleton data, that is, poster data that has undergone all layout processes to the impression estimation unit 218.

In S1308, the layout unit 217 determines whether all poster data are generated. Upon determining that poster data are generated using all combinations of skeletons, coloring pattern, and fonts, the layout unit 217 ends the layout processing, and the process advances to S913. Upon determining that not all poster data are generated, the process returns to S1301, and poster data is generated using a combination not used for generation.

S910 has been described above. The explanation will return to FIG. 9A.

In S911, the device color gamut acquisition unit 220 acquires a device color gamut linked with the printer designated by the printer designation unit 206, and outputs it to the gamut mapping unit 221.

In S912, the gamut mapping unit 221 performs gamut mapping for the image data in which each poster data acquired from the layout unit 217 is rendered such that all colors are fitted to the colors in the device color gamut acquired from the device color gamut acquisition unit 220.

Figure 24:
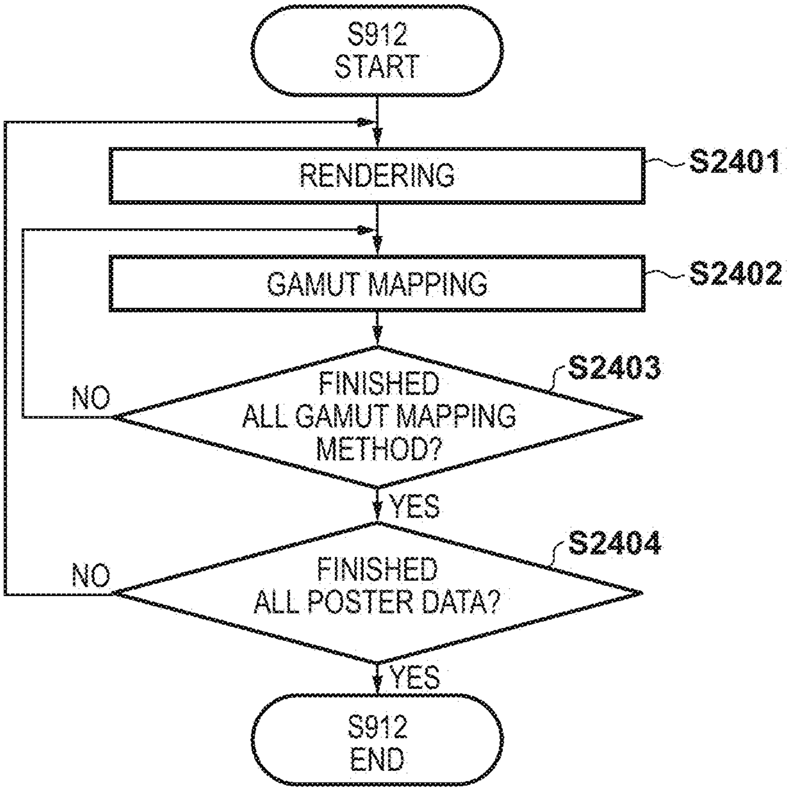
FIG. 24 is a flowchart showing the process of S912.

FIG. 24 is a flowchart for explaining S912 in detail. In S2401, the gamut mapping unit 221 executes rendering processing for each poster data generated in S910. Note that rendering processing is processing of changing poster data into image data.

Figure 25:
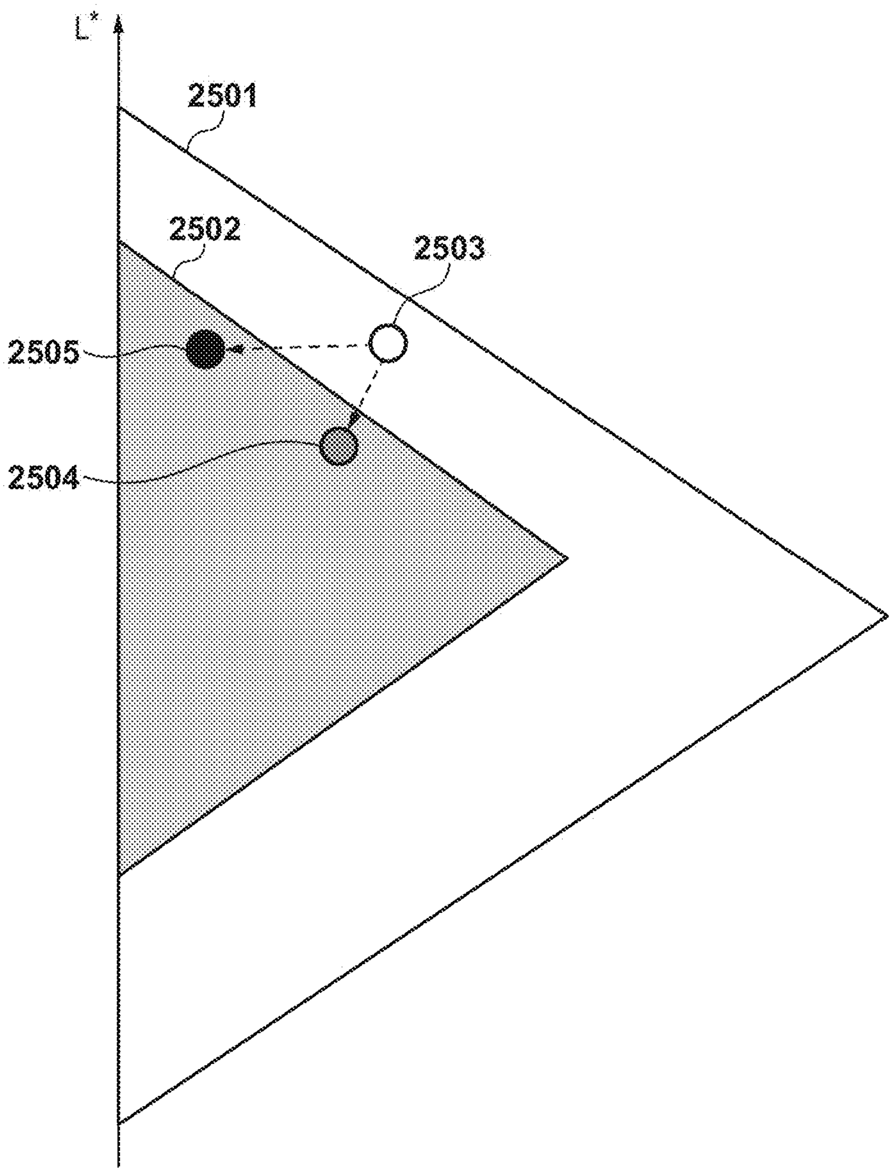
FIG. 25 is a view for explaining gamut mapping.

In S2402, the gamut mapping unit 221 executes gamut mapping for the image data rendered in S2401. FIG. 25 is a view for explaining gamut mapping. FIG. 25 shows an L*-a* plane in a CIE-L*a*b* color space. A color gamut 2501 is the color gamut of the input image data. A color gamut 2502 is the device color gamut acquired in S911, which is the color gamut after gamut mapping. A color 2503 is a color included in the input image data. Colors 2504 and 2505 are colors obtained by applying different gamut mapping methods to the color 2503. For example, the color 2504 has a small color difference to the color 2503, and therefore, the overall color change is small, but the luminance value is changed by the gamut mapping. On the other hand, as for the color 2505, gamut mapping is performed such that the luminance value is not too largely changed from the color 2503, but the chroma is reduced. As in the example shown in FIG. 25, in gamut mapping, colors change depending on the gamut mapping method, the model of the printer, and paper to print, and the like.

In S2403, the gamut mapping unit 221 determines whether all gamut mapping methods designated by the gamut mapping designation unit 207 are executed for the image data rendered in S2401. Upon determining that all gamut mapping methods are executed, the gamut mapping unit 221 advances to S2404, and otherwise, returns to S2402.

In S2404, the gamut mapping unit 221 determines whether the processes of S2401 to S2403 are executed for all poster data generated in S910. If all processes are executed, the processing is ended. Otherwise, the process returns to S2401.

Referring back to FIG. 9A, in S913, the impression estimation unit 218 estimates the impression of the poster image data acquired from the gamut mapping unit 221, and it links the impression with the poster image data. For example, even in the same coloring pattern, the arrangement changes if the skeleton changes. Hence, which color is actually used and in how much area the color is used change. For this reason, it is necessary to evaluate not only the tendency of the impression of each coloring pattern or skeleton but also the final impression of the poster. A color change caused by gamut mapping also affects the impression. For this reason, the impression estimation processing is executed for image data obtained by executing rendering and gamut mapping, in S912, for the poster data generated in S910. This can evaluate not only the impressions of the individual elements such as the arrangement and the coloring pattern of a poster but also the impression of the printed poster in which the images and the characters are laid out.

In S914, the poster selection unit 219 selects poster image data to be output to the display 105 (presented to the user) from the poster image data acquired from the impression estimation unit 218 and the estimated impression linked with the poster image data. In this embodiment, the poster selection unit 219 selects a poster for which the value of the distance between the target impression and the estimated impression of the poster is equal to or less than a predetermined threshold.

Note that in this embodiment, a Euclidean distance is used as a distance. The smaller the value indicated by the Euclidean distance is, the closer the target impression and the estimated impression are. Also, the distance calculated by the poster selection unit 219 is not limited to the Euclidean distance, and any distance such as a Manhattan distance or a cosine similarity can be used if the distance between vectors can be calculated.

Also, if the number of selected posters is less than the creation count designated by the poster creation condition designation unit 201, the poster selection unit 219 selects posters as many as the shortage in ascending order of the value of the distance between the target impression and the estimated impression of the poster. Note that in this embodiment, the poster selection unit 219 selects posters as many as the shortage, but the present invention is not limited to this. For example, if the number of posters selected by the poster selection unit 219 is less than the creation count, a message indicating the shortage may be displayed on the preview screen 601. Alternatively, the poster selection unit 219 may select posters as many as the shortage and then display these on the preview screen 601 such that posters for which the value of the distance between the target impression and the estimated impression is equal to or less than a threshold and posters for which the value of the distance is more than the threshold can be discriminated. Also, for example, if the number of selected posters is not sufficient, the process returns to S903 to increase the numbers of skeletons, coloring patterns, and fonts to be selected.

In S915, the poster display unit 205 renders the poster data selected by the poster selection unit 219 and outputs the poster image to the display 105. That is, the preview screen 601 shown in FIG. 6 is displayed. When the print button 604 is pressed, the poster display unit 205 outputs the selected poster image data to the printing unit 208.

In S916, the printing unit 208 prints the poster image data acquired from the poster display unit 205 via the printing apparatus 120. Note that the poster image data to be printed in this embodiment has undergone gamut mapping in S912 and therefore has colors within the device color gamut. For this reason, the printing apparatus 120 need not perform gamut mapping again, and if printing is performed in the Colorimetric mode, the colors intended at the time of poster generation can directly be printed. Note that although one printing apparatus is used in this embodiment, if there are a plurality of printing apparatuses, a printing apparatus designated in the printer designation box 516 can be used for printing.

The poster generation processing procedure of generating a poster according to the designation of an impression by the user has been described above.

As described above, according to this embodiment, it is possible to generate a poster that expresses an impression required by the user. More specifically, in this embodiment, the elements constituting a poster, such as a skeleton, a coloring pattern, and font are combined based on the target impression, thereby generating a plurality of variations of poster candidates according to the target impression. Furthermore, after one or a plurality of gamut mapping processes are applied to the poster candidates, the impressions of entire posters are estimated, and a poster close to the target impression is selected from the poster candidates. It is therefore possible to generate a poster in which not only the impression of each single element but also the impression as a whole complies with the user intention after printing.

When printing image data, colors in digital data and color after printing do not match depending on the model of the printer, the type of a medium to print, and the gamut mapping method. For this reason, even if a poster image with a certain impression is created as image data, the colors change upon printing, resulting in a different impression. In this embodiment, since impression estimation and poster image selection are performed for poster image data that has undergone gamut mapping, a poster image close to the target impression can be generated in accordance with the printer and the medium. More specifically, for example, assume that in this embodiment, as the target impression on the application activation screen 501, the premium nature is designated as −1, the familiarity is designated as +1, and the dynamism and the profoundness are designated as off. At this time, for example, the poster image 602 on the preview screen 601 is generated with an estimated impression close to the target impression such that the premium nature is −1.2, the familiarity is +0.9, the dynamism is +0.2, and the profoundness is −1.3. Furthermore, since the poster image 602 is formed in the color gamut capable of reproducing colors even in printing, the same impression can be maintained even after printing.

Modification of First Embodiment

In the first embodiment, as the objects used to perform the operation of setting the target impression, the impression sliders 508 to 511 of the application activation screen 501 are used. However, the target impression setting method is not limited to this.

FIGS. 16A to 16D are views showing examples of UIs that set target impressions. FIG. 16A shows an example in which the target impression is set by a UI on a radar chart. The target impression of each axis is set by operating a handle 1601 on the radar chart shown in FIG. 16A. The target impression designation unit 204 acquires target impressions such that −2 is set when the handle 1601 is located at the center of the UI, and +2 is set when the handle 1601 is located at the outermost position. In FIG. 16A, as the target impressions, the premium nature is set to +0.8, the familiarity is set to +1.1, the dynamism is set to −0.1, and the profoundness is set to −0.7. The target impressions can thus be set to decimal values. Also, the radar chart of FIG. 16B shows an example in which some target impressions are set to off. For example, by double-clicking the handle 1601 using the pointing device 107, the user can turn off the target impression of the axis corresponding to the handle 1601 such that it is not displayed. Note that by clicking an axis 1602 on the radar chart using the pointing device 107 again, the user can turn on the target impression such that it is displayed again. In FIG. 16B, the target impressions except the dynamism are the same as in FIG. 16A, but the dynamism is off.

FIG. 16C shows an example of a UI that sets target impressions not by words but from images. In a sample poster display region 1603, poster images 1604 to 1607 each of which has undergone impression estimation and has one of the impressions set large are arranged. Also, a checkbox 1608 is displayed on each poster image. The user clicks, using the pointing device 107, a poster considered to be close to a poster be created, thereby turning on the checkbox 1608 to set a selected state. The target impression designation unit 204 refers to an impression corresponding to the poster image in the selected state, thereby deciding the target impression.

FIG. 16D is a table showing impressions corresponding to the poster images 1604 to 1607 in FIG. 16C and final target impressions. The columns of the premium nature, the familiarity, the dynamism, and the profoundness show numbers indicating how much the poster images affect the impressions. For example, assume that the poster images 1604 and 1607 are selected, as shown in FIG. 16C. In this case, the target impression designation unit 204 decides an impression obtained by combining the impressions of the poster images 1604 and 1607 as the target impression. In this example, a value whose absolute value is largest in the values of the numbers of the impression of each factor corresponding to the selected poster images is set to the value of the number of each factor of the target impression. Note that an example in which the poster image for which each impression is largest is presented has been described, but the present invention is not limited to this. A poster image for which a plurality of impressions are large may be used, or poster images more than the number of impressions may be presented. This allows the user to intuitively designate the target impression not by words but from actual posters.

Also, in this embodiment, poster data has been described as an example of the commercial material data. However, the operation according to this embodiment can be applied not only to a poster but also to other types of commercial material. Not a poster but, for example, a banner or the like may be used. In this case, in place of the poster preview shown in FIG. 6, a banner image is displayed as a commercial material image.

Second Embodiment

The second embodiment will be described below concerning differences from the first embodiment. In the first embodiment, processing of selecting a skeleton, a coloring pattern, and fonts that are the constituent elements of a poster based on a target impression and generating a poster has been described. In the second embodiment, a combination generation unit searches for a combination of constituent elements of a poster, which makes the impression of the whole poster close to the target impression, based on a genetic algorithm. This makes it possible to more flexibly select constituent elements of a poster, which are optimum for the target impression, without pre-calculation such as a skeleton impression table, a coloring pattern impression table, and a font impression table.

Figure 17:
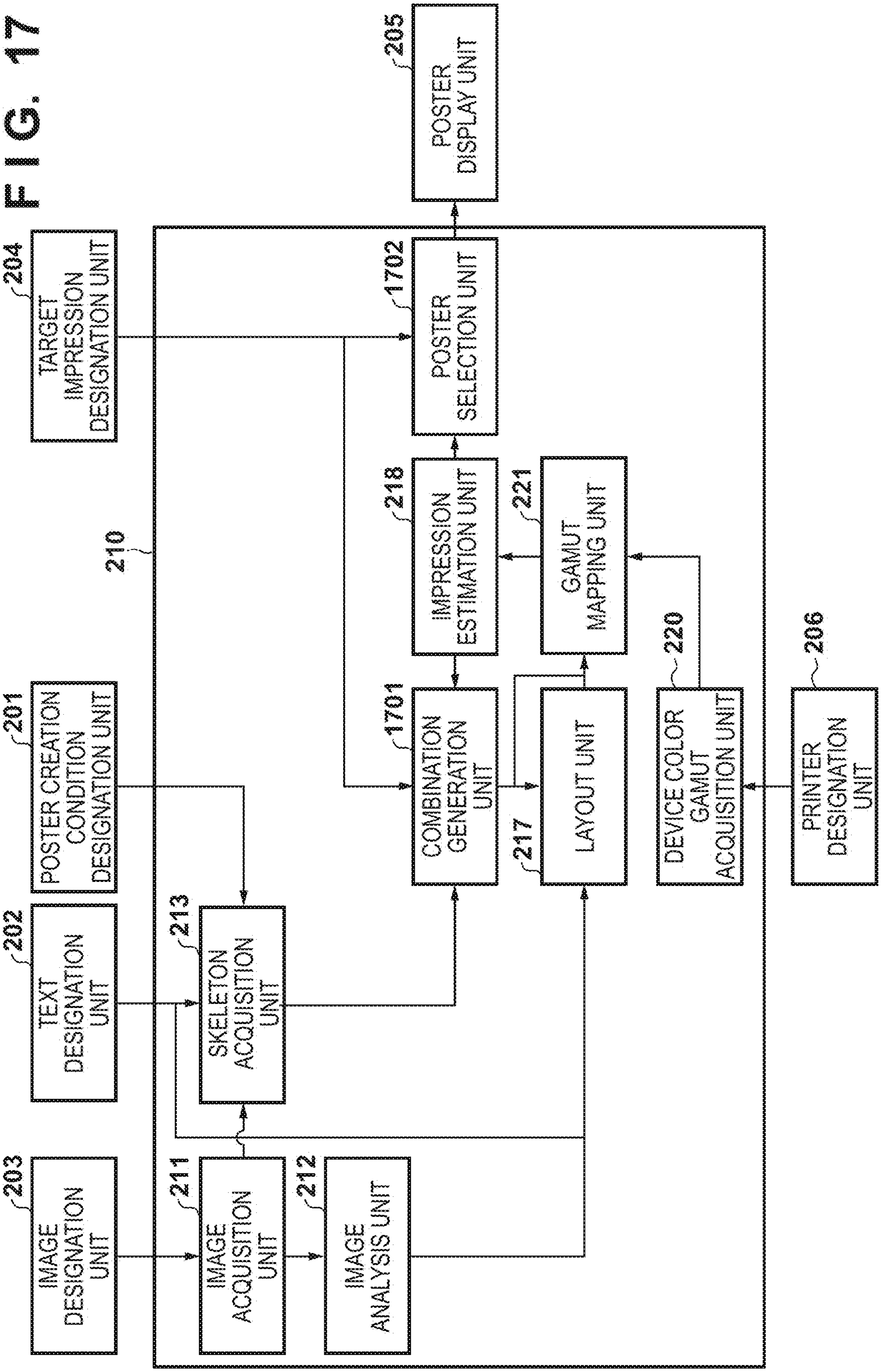
FIG. 17 is a software block diagram of a poster creation application.

FIG. 17 is a software block diagram of a poster creation application according to the second embodiment. In the configuration of the block diagram shown in FIG. 17, a combination generation unit 1701 is formed in place of the skeleton selection unit 214, the coloring pattern selection unit 215, and the font selection unit 216 in FIG. 2. Note that the components denoted by the same reference numerals as in FIG. 2 execute the same processes as those described in the first embodiment, and a description thereof will be omitted here.

The combination generation unit 1701 acquires one or a plurality of skeletons from a skeleton acquisition unit 213, poster data and a poster estimated impression from an impression estimation unit 218, and a target impression from a target impression designation unit 204. The combination generation unit 1701 also acquires lists of coloring patterns and fonts from an HDD 104.

Furthermore, the combination generation unit 1701 acquires a list of gamut mapping methods from the HDD 104. The combination generation unit 1701 generates combinations of the poster constituent elements (the skeletons, the coloring patterns, and the fonts) and the gamut mapping methods used for poster generation. The combination generation unit 1701 outputs the generated combinations of poster constituent elements to a layout unit 217. Also, the combination generation unit 1701 outputs the generated gamut mapping methods to a gamut mapping unit 221.

A poster selection unit 1702 selects, from the poster data acquired from the impression estimation unit 218, a poster for which the value of the distance between the estimated impression of the poster and the target impression designated by the target impression designation unit 204 is equal to or less than a threshold, and stores it in a RAM 103. In addition, the poster selection unit 1702 determines whether the number of selected and stored posters has reached a creation count designated in a creation count box 514.

Figure 18:
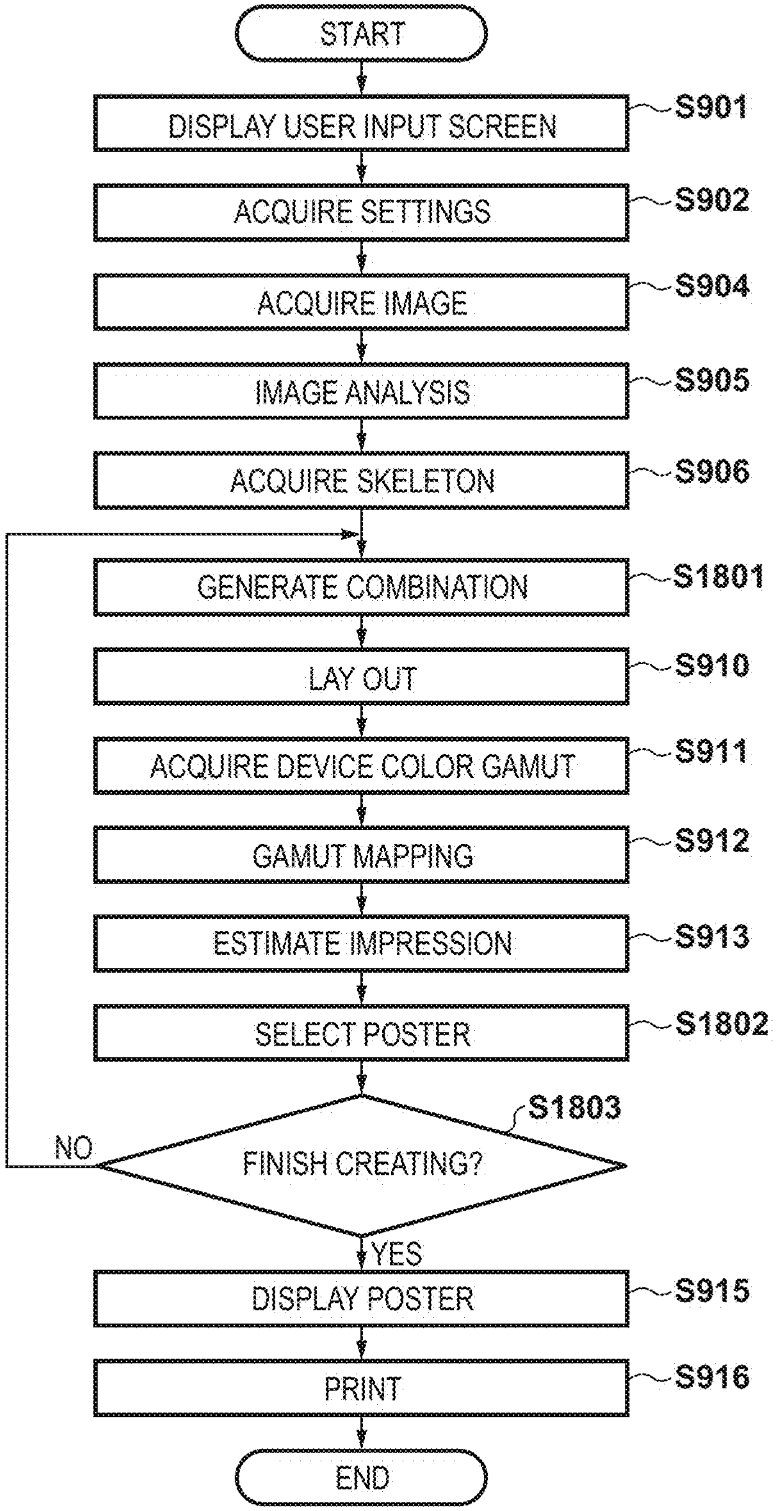
FIG. 18 is a flowchart showing poster generation processing.

FIG. 18 is a flowchart showing processing of a poster generation unit 210 of the poster creation application according to this embodiment. Note that in the processing of this flowchart, processes indicated by the same numbers as in the flowchart of FIG. 9 execute the same processes described in the first embodiment, and a description thereof will be omitted here. Note that in the processing of this flowchart, S903 and S907 to S909 shown in FIG. 9 are omitted.

In the description of S1801 after S906, an operation at the time of execution for the first time and an operation from the second loop will separately be described. When executing S1801 for the first time, the combination generation unit 1701 acquires the tables of skeletons, coloring pattern, and fonts to be used for poster generation. FIGS. 19A to 19E are views for explaining the tables used by the combination generation unit 1701. FIG. 19A shows a list of skeletons that the combination generation unit 1701 acquires from the skeleton acquisition unit 213. FIGS. 19B, 19C, and 19D show a list of fonts, a list of coloring patterns, and a list of gamut mapping methods, respectively, that the combination generation unit 1701 acquires from the HDD 104. The combination generation unit 1701 generates random combinations from the three tables. In this example, 100 combinations are generated. FIG. 19E shows a combination table generated in this embodiment.

After that, the combination generation unit 1701 executes the processes of S910 to S1802 for all the generated combinations.

Next, from the second loop of S1801, the combination generation unit 1701 calculates the value of the distance between the target impression and the poster estimated impression acquired from the impression estimation unit 218 and links it with the combination table. FIGS. 20A and 20B are views for explaining the operation of S1801 from the second loop. FIG. 20A is a table that links the value of the distance between the poster estimated impression and the target impression with FIG. 19E. More specifically, the layout unit 217 generates posters based on FIG. 19E, the gamut mapping unit 221 executes gamut mapping for each of the generated posters, and the impression estimation unit 218 estimates the impression of each of the generated posters. The distance column in FIG. 20A shows the values of the distances between the target impression and the estimated impressions of the posters generated in the combinations of the rows. The combination generation unit 1701 generates a new combination table from FIG. 20A. FIG. 20B shows the newly generated combination table. In this embodiment, new combinations are generated using tournament selection and uniform crossover in a genetic algorithm. First, N combinations are selected at random from the table shown in FIG. 20A. Here, for example, N=3. Next, two high-rank combinations each having a small distance (=close to the target impression) are selected from the selected combinations. Finally, in the two selected combinations, the elements (skeleton IDs, coloring pattern IDs, and font IDs) of the combinations are replaced with each other at random, thereby generating new combinations. For example, combination IDs 1 and 2 in FIG. 20B show the results generated from combination IDs 1 and 3 in FIG. 20A, and the coloring pattern IDs are replaced here. FIG. 20B shows the result of generating 100 new combinations by repeating the above-described procedure.

This makes it possible to efficiently search for a combination based on the value of the distance between the target impression and the estimated impression. Note that in this embodiment, 100 combinations are generated, but the present invention is not limited to this. Also, tournament selection and uniform crossover are used. However, the present invention is not limited to this and, for example, another method such as ranking selection, roulette selection, or single point crossover may be used. In addition, mutation may be incorporated such that a risk of falling into a local optimal resolution is eliminated. A skeleton (arrangement), a coloring pattern, and a font are used as the constituent elements of the poster to be searched for. However, other constituent elements may be used. For example, a plurality of patterns to be inserted into the background of the poster may be prepared, and which pattern should be used or not may be decided by the search. When the constituent elements to be searched for are increased, more variations of posters can be generated, and the width of impression expression can be increased. As the gamut mapping method, all methods stored in the HDD 104 are used. However, like a gamut mapping designation region 517 shown in FIG. 5, only a designated gamut mapping method may be used for the search.

In S1802 after S913, the poster selection unit 1702 calculates the value of the distance between the poster estimated impression and the target impression, like S1801, and creates the same table as in FIG. 20A. The poster selection unit 1702 stores, in the RAM 103, poster images for which the value of the distance to the target impression is equal to or less than a threshold.

In S1803, the poster selection unit 1702 determines whether the number of poster images stored in the RAM 103 in S1802 has reached the creation count designated in the creation count box 514. Upon determining that the number of poster images has reached the creation count, the poster selection unit 1702 ends the poster generation processing. Upon determining that the number of poster images has not reached the creation count, the poster selection unit 1702 returns to S1801. That is, the above-described process of S1801 in the second loop is executed, and the processes of S1801 to S1802 are repetitively executed until the number of poster images stored in the RAM 103, for which the value of the distance to the target impression is equal to or less than the threshold, reaches the designated creation count. Note that if the number of stored poster images for which the value of the distance to the target impression is equal to or less than the threshold is equal to or more than the designated creation count, the poster selection unit 1702 may compare the values of the distances of the stored poster images, and finally store only the poster images having a smaller value in the RAM 103. A poster image judged to have a larger value based on the comparison result may be deleted from the RAM 103.

Note that in this embodiment, a combination of poster constituent elements is searched for by the genetic algorithm. However, the search method is not limited to this, and another search method such as neighborhood search or tab search may be used.

As described above, according to this embodiment, a combination of constituent elements used in a poster is searched for, thereby generating a poster for which the impression of the entire generated poster is close to the target impression. This is particularly effective when generating a poster in accordance with an image or character information input by the user. For example, consider a case where although an image has a dynamic impression, a poster with a restrained impression should be generated as a whole. In this embodiment, it is possible to evaluate the impression of the whole poster and search for a combination of a skeleton, a coloring pattern, and fonts, which makes the impression close to the target impression. Hence, to suppress the impression of an image, the constituent elements of the poster can be controlled in accordance with the image by, for example, using a skeleton with a small image area or using more restrained fonts and colors. Also, in this embodiment, even if the user does not understand the characteristics of gamut mapping methods, a gamut mapping method for obtaining a suitable impression can automatically be selected by the search. According to this embodiment, it is possible to flexibly find a combination of constituent elements and a gamut mapping method optimum for the impression of a whole poster and creates many variations of the poster close to the target impression.

Third Embodiment

The third embodiment will be described below concerning differences from the first and second embodiments. In the first and second embodiments, an example in which a poster is generated by controlling the constituent elements of the poster based on a target impression has been described. In the third embodiment, an example in which a template formed by combining a skeleton, a coloring pattern, and a font is prepared in advance, and a layout unit generates a poster only by setting images and character information will be described. This makes it possible to generate a poster matching a target impression by simpler processing.

Figure 21:
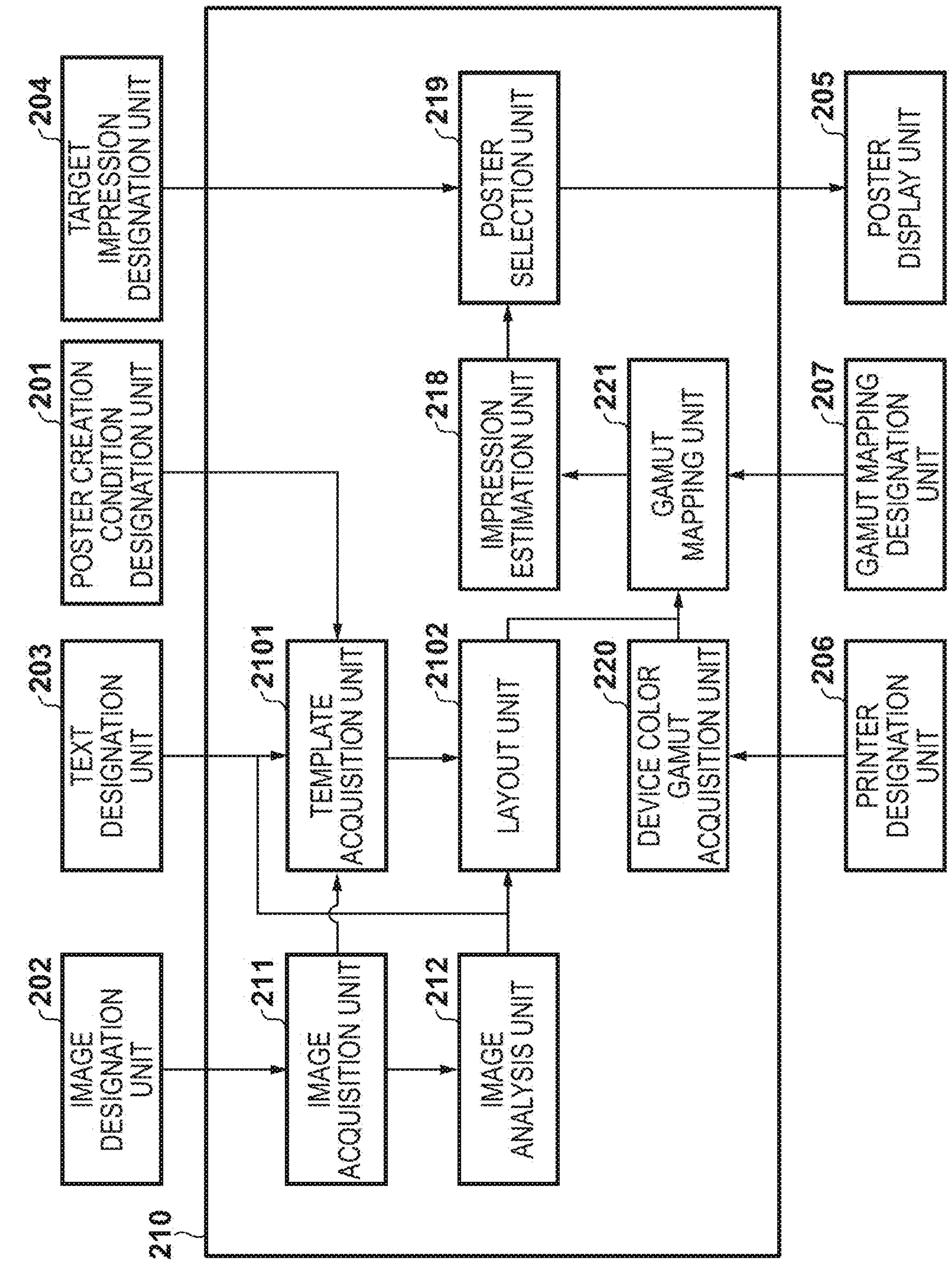
FIG. 21 is a software block diagram of a poster creation application.

FIG. 21 is a software block diagram of a poster creation application according to the third embodiment. In the configuration of the block diagram shown in FIG. 21, a template acquisition unit 2101 is formed in place of the skeleton acquisition unit 213, the skeleton selection unit 214, the coloring pattern selection unit 215, and the font selection unit 216 in FIG. 2. Note that the components denoted by the same reference numerals as in FIG. 2 execute the same processes as those described in the first embodiment, and a description thereof will be omitted here.

The template acquisition unit 2101 acquires, from an HDD 104, a template group that matches conditions designated by a poster creation condition designation unit 201, a text designation unit 202, and an image acquisition unit 211. In this embodiment, the template indicates a skeleton in which a coloring and fonts are set in advance. The template acquisition unit 2101 outputs the acquired template group to a layout unit 2102.

The layout unit 2102 lays out an image acquired from the image acquisition unit 211 and a text acquired from the text designation unit 202 on each template acquired from the template acquisition unit 2101, thereby generating poster data. The layout unit 2102 outputs the generated poster data group to an impression estimation unit 218.

Figure 22:
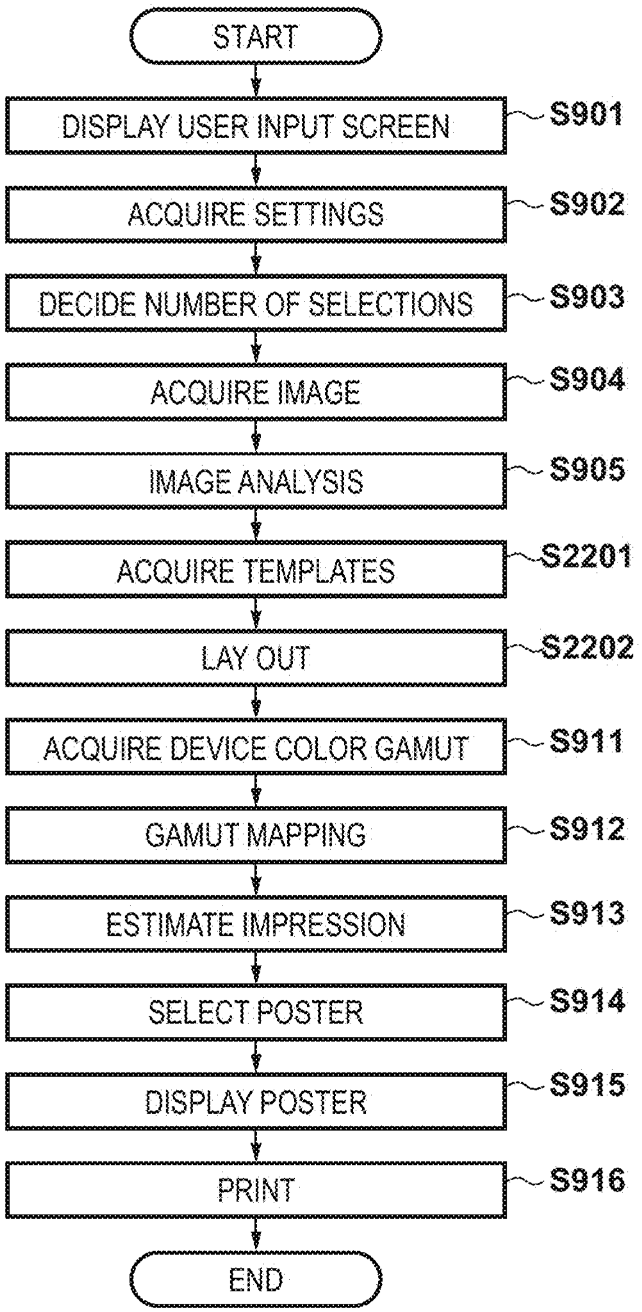
FIG. 22 is a flowchart showing poster generation processing.

FIG. 22 is a flowchart showing processing of a poster generation unit 210 of a poster creation application according to this embodiment. Note that processes indicated by the same numbers as in FIG. 9 execute the same processes described in the first embodiment, and a description thereof will be omitted here. Note that in the processing of this flowchart, S906 to S909 shown in FIG. 9 are omitted.

In S2201 after S905, the template acquisition unit 2101 acquires, from the HDD 104, one or a plurality of templates matching the conditions designated by the poster creation condition designation unit 201, the text designation unit 202, and the image acquisition unit 211. In this embodiment, the template indicates a skeleton in which a coloring and fonts are set in advance. Also, one template is described in one file and stored in the HDD 104.

Like the skeleton acquisition unit 213, the template acquisition unit 2101 sequentially reads out the template files from the HDD 104 to a RAM 103, leaves templates matching the set conditions on the RAM 103, and erases templates not matching the conditions from the RAM 103. The template acquisition unit 2101 then outputs the one or plurality of acquired templates to the layout unit 2102.

In S2202, the layout unit 2102 lays out an image acquired from the image acquisition unit 211 and a text acquired from the text designation unit 202 on each template acquired from the template acquisition unit 2101, thereby generating poster data. The layout unit 2102 outputs the one or plurality of generated poster data to the impression estimation unit 218. Note that since the setting of the image is the same as that of the image arranging unit 1202, and setting of the character information is the same as that of the text arranging unit 1205, a description thereof will be omitted.

As described above, according to this embodiment, the templates in which various colorings and fonts are set in advance are prepared, thereby generating a poster close to the target impression by simple processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-163583, filed Sep. 26, 2023, which is hereby incorporated by reference herein in its entirety.

What is claimed is:

1. An information processing apparatus comprising:

at least one processor and at least a memory coupled to the at least one processor and having instructions stored thereon, and when executed by the at least one processor, acting as:

a first acceptance unit configured to accept contents of a commercial material;

a second acceptance unit configured to accept a designation of an impression the commercial material gives to a user;

a third acceptance unit configured to accept a condition of the commercial material;

an acquisition unit configured to acquire information of a color gamut reproducible by a printing unit that prints the commercial material;

a generation unit configured to generate a plurality of commercial material data based on the contents accepted by the first acceptance unit, the designation of the impression accepted by the second acceptance unit, and the condition of the commercial material accepted by the third acceptance unit; and a display unit configured to display a commercial material image based on the plurality of commercial material data generated by the generation unit, wherein the commercial material image is an image represented by data specified based on the designation of the impression accepted by the second acceptance unit from a plurality of data generated from the plurality of commercial material data based on the information of the color gamut acquired by the acquisition unit.

2. The apparatus according to claim 1, wherein the plurality of data are data generated by converting color gamuts of the plurality of commercial material data based on the information of the color gamut acquired by the acquisition unit.

3. The apparatus according to claim 2, wherein the information of the color gamut includes a color gamut conversion method.

4. The apparatus according to claim 2, wherein the at least one processor and the at least a memory further act as:

an estimation unit configured to estimate an impression of data obtained by converting the color gamut of each of the plurality of commercial material data; and a specifying unit configured to specify the data for displaying the commercial material image from the data estimated by the estimation unit based on the designation of the impression accepted by the second acceptance unit.

5. The apparatus according to claim 1, wherein the at least one processor and the at least a memory further act as:

a second acquisition unit configured to acquire a plurality of commercial material constituent elements based on the designation of the impression accepted by the second acceptance unit.

6. The apparatus according to claim 5, wherein the generation unit generates the plurality of commercial material data corresponding to the plurality of commercial material constituent elements acquired by the second acquisition unit.

7. The apparatus according to claim 6, wherein the at least one processor and the at least a memory further act as:

a storage unit configured to store a table in which the plurality of commercial material constituent elements are defined, and in the table, each of the plurality of commercial material constituent elements is associated with an impression.

8. The apparatus according to claim 7, wherein the acquisition unit acquires, from the table, a plurality of commercial material constituent elements close to the designation of the impression accepted by the second acceptance unit.

9. The apparatus according to claim 5, wherein the acquisition of the plurality of commercial material constituent elements by the second acquisition unit is performed by a genetic algorithm.

10. The apparatus according to claim 5, wherein the commercial material constituent elements include a skeleton used to decide an arrangement of the contents.

11. The apparatus according to claim 5, wherein the commercial material constituent elements include a coloring pattern.

12. The apparatus according to claim 11, wherein the coloring pattern is a combination of a plurality of colors.

13. The apparatus according to claim 5, wherein the commercial material constituent elements include a font pattern.

14. The apparatus according to claim 13, wherein the font pattern is a combination of a title font and a text font.

15. The apparatus according to claim 1, wherein the commercial material image is displayed to be selectable by the user.

16. The apparatus according to claim 1, wherein the second acceptance unit accepts a value set by a slider bar as the designation of the impression.

17. The apparatus according to claim 1, wherein the second acceptance unit accepts selection of an image serving as a sample, thereby accepting the designation of the impression.

18. The apparatus according to claim 1, wherein the commercial material includes a poster.

19. A method executed by an information processing apparatus, comprising:

accepting contents of a commercial material;

accepting a designation of an impression the commercial material gives to a user;

accepting a condition of the commercial material;

acquiring information of a color gamut reproducible by a printing unit that prints the commercial material;

generating a plurality of commercial material data based on the accepted contents, the accepted designation of the impression, and the accepted condition of the commercial material; and displaying a commercial material image based on the plurality of generated commercial material data, wherein the commercial material image is an image represented by data specified based on the accepted designation of the impression from a plurality of data generated from the plurality of commercial material data based on the acquired information of the color gamut.

20. A non-transitory computer-readable storage medium that stores one or more programs including instructions, which when executed by one or more processors of an information processing apparatus, cause the information processing apparatus to perform a method, the method comprising:

accepting contents of a commercial material;

accepting a designation of an impression the commercial material gives to a user;

accepting a condition of the commercial material;

acquiring information of a color gamut reproducible by a printing unit that prints the commercial material;

generating a plurality of commercial material data based on the accepted contents, the accepted designation of the impression, and the accepted condition of the commercial material; and displaying a commercial material image based on the plurality of generated commercial material data, wherein the commercial material image is an image represented by data specified based on the accepted designation of the impression from a plurality of data generated from the plurality of commercial material data based on the acquired information of the color gamut.

* * * * *